(12) United States Patent
Leister et al.

(10) Patent No.: US 12,072,492 B2
(45) Date of Patent: Aug. 27, 2024

(54) DISPLAY DEVICE

(71) Applicant: SEEREAL TECHNOLGIES S.A., Munsbach (LU)

(72) Inventors: Norbert Leister, Dresden Sachsen (DE); Hagen Sahm, Dresden (DE); Yuri Gritsai, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 357 days.

(21) Appl. No.: 17/041,940

(22) PCT Filed: Mar. 25, 2019

(86) PCT No.: PCT/EP2019/057379
§ 371 (c)(1),
(2) Date: Sep. 25, 2020

(87) PCT Pub. No.: WO2019/185510
PCT Pub. Date: Oct. 3, 2019

(65) Prior Publication Data
US 2021/0011300 A1    Jan. 14, 2021

(30) Foreign Application Priority Data
Mar. 26, 2018 (EP) .................... 18164096

(51) Int. Cl.
*G02B 27/01* (2006.01)
*G02B 5/18* (2006.01)
(Continued)

(52) U.S. Cl.
CPC ....... *G02B 27/0172* (2013.01); *G02B 5/1833* (2013.01); *G02B 5/3016* (2013.01);
(Continued)

(58) Field of Classification Search
CPC .. G02B 27/01; G02B 27/017; G02B 27/0172; G02B 2027/0174; G02B 5/30;
(Continued)

(56) References Cited

U.S. PATENT DOCUMENTS

| 6,750,996 B2 * | 6/2004 | Jagt ...................... G02B 6/0056 359/34 |
| 9,406,166 B2 * | 8/2016 | Futterer ............... G02B 6/0016 |

(Continued)

FOREIGN PATENT DOCUMENTS

| WO | 2012062681 A1 | 5/2012 |
| WO | 2018011285 A1 | 1/2018 |

OTHER PUBLICATIONS

Applied Physics B (2018) 124:52 (Year: 2018).*
(Continued)

*Primary Examiner* — Michelle R Connelly
(74) *Attorney, Agent, or Firm* — Saul Ewing LLP

(57) ABSTRACT

A display device for representing three-dimensional scenes is provided. The display device comprises at least one illumination device, at least one spatial light modulation device and at least one Bragg polarization grating. The Bragg polarization grating comprises at least one birefringent layer, incident light being deflectable at a deflection angle of at least 20°.

36 Claims, 11 Drawing Sheets

(51) Int. Cl.
  *G02B 5/30* (2006.01)
  *G02B 27/02* (2006.01)
  *G02F 1/29* (2006.01)
  *F21V 8/00* (2006.01)

(52) U.S. Cl.
  CPC ............ *G02B 27/02* (2013.01); *G02B 27/022* (2013.01); *G02F 1/292* (2013.01); *G02B 6/0016* (2013.01); *G02B 6/0056* (2013.01)

(58) Field of Classification Search
  CPC ...... G02B 5/3016; G02B 5/32; G02B 5/1833; G02B 5/18; G02B 5/1814; G02F 1/292
  See application file for complete search history.

(56) References Cited

U.S. PATENT DOCUMENTS

| | | | | |
|---|---|---|---|---|
| 10,698,214 | B2* | 6/2020 | Vallius | G02B 27/0081 |
| 10,859,740 | B2* | 12/2020 | Escuti | G02F 1/1334 |
| 2014/0210770 | A1* | 7/2014 | Chen | G06F 3/044 |
| | | | | 345/174 |
| 2014/0361990 | A1* | 12/2014 | Leister | G02B 30/31 |
| | | | | 345/156 |
| 2015/0268399 | A1* | 9/2015 | Futterer | G02B 6/0076 |
| | | | | 362/606 |
| 2016/0033698 | A1 | 2/2016 | Escuti et al. | |
| 2018/0129048 | A1* | 5/2018 | Robbins | G02B 27/0172 |
| 2020/0192101 | A1* | 6/2020 | Ayres | G02B 6/0055 |
| 2022/0082837 | A1* | 3/2022 | Cheng | G02B 6/0076 |

OTHER PUBLICATIONS

Weng et al. ("Polarization volume grating with high efficiency and large diffraction angle", Optics Express, vol. 24, No. 16, Aug. 8, 2016) (Year: 2016).*
Weng et al. ("Polarization volume grating with high efficiency and large diffraction angle", Optics Express, vol. 24, No. 16, Aug. 8, 2016) and Robbins et al. (US 2018/0129048 A1). (Year: 2016).*
Kress, Bernard , et al., "A review of head-mounted displays (HMD) technologies and applications for consumer electronics", Proc. of SPIE, US; vol. 8720, pp. 87200A May 31, 2013 XP055285678.
Minski Park , et al., "Digital Holographic Display System with Large Screen Based on Viewing Window Movement for 3D Video Service", ETRI Journal, KR, vol. 36, No. 2 Apr. 1, 2014 pp. 232-241 XP055456037.
Weng, Yishi , et al., "Polarization volume grating with high efficiency and large diffraction angle", Optics Express, vol. 24, No. 16, Aug. 8, 2016 pp. 17746-17759.
Xiao Xiang , et al., "Nanoscale liquid crystal polymer Bragg polarization gratings", Optics Express, Bd. 25, Nr. 16, pp. 19298 Aug. 7, 2017 XP055591773.
International Search Report, dated Jun. 6, 2019, and Written Opinion, issued in international applicaton No. PCT/EP2019/057379.

* cited by examiner

DISPLAY DEVICE

CROSS REFERENCE TO RELATED APPLICATIONS

This application claims the priority of PCT/EP2019/057379, filed on Mar. 25, 2019, which claims priority to European Application No. EP 18164096.2, filed on Mar. 26, 2018, the entire contents of each of which are incorporated fully herein by reference.

BACKGROUND OF THE INVENTION

The invention relates to a display device for representing three-dimensional scenes. Such a display device in this case comprises at least one polarization grating element, in particular a polarization grating element which has Bragg properties.

It is widely known that polarization gratings are diffractive optical elements, which may also be constructed on the basis of liquid crystals, and therefore have a birefringence, or act anisotropically. These polarization gratings are therefore based on a spatial periodic variation of the orientation of the liquid crystal molecules, which leads to a local variation of the birefringence. They locally modulate the incident polarized light. Polarization gratings may, as thin films, have a high diffraction efficiency in a diffraction order, the diffraction efficiency value depending on the polarization of the light. Polarization gratings may modify the polarization state of the light; for example, they may convert linearly polarized light into left-polarized or right-polarized light. Because of these properties of polarization gratings, they are particularly suitable for display devices, or displays. In these, they may for example be used as polarization beam splitters or as beam control elements.

Polarization gratings which are generated by a continuous rotation of the orientation axis perpendicularly to the grating plane have been developed, the rotation angle of the orientation axis within one period being 180 degrees. Such polarization gratings are known as circular polarization gratings, and are of great interest for applications in the field of displays. These polarization gratings are generally formed from a spirally increasing molecular orientation, which leads to a rotation of a locally linear birefringence over the grating and uniformity in the z direction. One method often used for producing such gratings is polarization holography, in which two coherent light beams polarized orthogonally to one another generate an interference pattern. The diffraction efficiency q of a circular polarization grating for light with normal incidence may be determined as:

$$\eta_0 = \cos^2\left(\frac{\pi \Delta n_1 d}{\lambda}\right)$$

$$\eta_{\pm 1} = \frac{1 \pm S'_3}{2} \sin^2\left(\frac{\pi \Delta n_1 d}{\lambda}\right)$$

$$\eta_0 = \cos^2\left(\frac{\pi \Delta n_1 d}{\lambda}\right),$$

where $\lambda$ is the wavelength, $\eta_m$ is the diffraction efficiency of the $m^{th}$ diffraction order, $\Delta n_l$ is the linear birefringence, d is the grating thickness and $S'_3 = S_3/S_0$ is the normalized Stokes parameter of the incident light. In this case, a paraxial approximation of all waves propagating in directions close to the z axis is assumed. They therefore describe gratings having a small diffraction angle, which exhibit a specific behavior. Circularly polarized light may be diffracted or deflected efficiently by a circular polarization grating. There are in this case only three diffraction orders, namely the zeroth diffraction order and the $\pm 1^{st}$ diffraction orders. Each diffraction order may have diffraction efficiencies $\eta$ of from 0% to almost 100% given a correct value of the birefringence. In particular, the $\pm 1^{st}$ diffraction orders may have a diffraction efficiency of nearly 100% when $\sin^2(\pi \Delta n \, d/\lambda)=1$, and therefore when $\Delta n \, d=\lambda/2$. The diffraction direction, or the diffraction efficiency $\eta_{\pm 1}$ of the deflection direction of the light into the $+1^{st}$ diffraction order or into the $-1^{st}$ diffraction order, in this case depends on the circular polarization of the incident light, i.e. whether left-circularly polarized light with a Stokes parameter $S'_3=-1$ or right-circularly polarized light with a Stokes parameter $S'_3=+1$ is incident on the polarization grating. The diffraction efficiency $\eta_0$ of the zeroth diffraction order is in this case independent of the polarization direction of the incident light. If linearly polarized light with a Stokes parameter $S'_3=0$ is incident on the circular polarization grating, however, the light is diffracted, or deflected, respectively with the same intensity with an equal diffraction efficiency both into the $+1^{st}$ diffraction order and into the $-1^{st}$ diffraction order. If circularly polarized light is incident on the circular polarization grating, it is converted into oppositely circularly polarized light. In particular, gratings having relatively large periods, i.e. periods of $\Lambda > 2$ μm, have these diffraction properties of circular polarization gratings for light with normal incidence.

Despite the good diffraction properties of known circular polarization gratings, corresponding optical elements which can also provide large diffraction angles of the light, besides a high diffraction efficiency, are required for use in display devices, or displays. In this case, diffraction angles, or deflection angles, are required which are much greater than the angles that can be achieved by hitherto known polarization gratings having a grating period of about 2 μm, i.e. an angle of approximately 15° for a wavelength of 532 nm. In simulations, it has been shown that the maximum diffraction efficiency in the $1^{st}$ diffraction order decreases drastically when the grating period approaches the wavelength used. In order to achieve a high diffraction efficiency and large diffraction angles simultaneously with thin circular polarization gratings, materials having a high linear birefringence could be used. Such polarization gratings, however, are technically difficult to provide.

The best-known materials which are used for producing circular polarization gratings by means of polarization holography are liquid crystal materials, so-called reactive mesogens, which are applied on an alignment layer. Such circular polarization gratings consist of two layers, namely the layer of reactive mesogens and the alignment layer, which are formed in two steps. First, a periodic rotation of the orientation direction of the thin alignment layer is generated by using polarization holography. A reactive mesogen mixture is subsequently applied onto the alignment layer, this mixture being aligned with the surface pattern of the alignment layer and fixed by means of UV exposure.

In the publication "Polarization volume grating with high efficiency and large diffraction angle" Yi. Weng, D. Xu, Yu. Zhang, X. Lim, Sh. Wu: Opt. Express 24 17746 (2016), a new type of grating is described, so-called polarization volume gratings, with which small grating periods and high diffraction efficiencies may theoretically be provided in reactive mesogen alignment layers. It is proposed to provide a periodic structure by using a cholesteric liquid crystal and a modulated alignment layer, which is modulated in two spatial dimensions. The superposition of these two spatial modulations can generate inclined diffraction planes. Simulations have shown that a high diffraction efficiency of up to 100% may be achieved.

Polarization gratings based on Bragg diffraction are furthermore known, which are based on an alternative production method and may likewise provide high diffraction efficiencies and high deflection angles. Such Bragg polarization gratings are likewise generated by means of polarization holography. This Bragg polarization grating, however, is based on the special properties of a photo-crosslinked liquid crystal polymer and a two-step photochemical/thermal production process, the so-called bulk photoalignment method.

SUMMARY OF THE INVENTION

It is therefore an object of the present invention to provide a display device comprising at least one polarization grating having diffraction properties, for three-dimensional representation of scenes, which is an alternative to display devices already known from the prior art. The display device is furthermore intended to be usable in particular for the field of augmented reality and/or the field of virtual reality.

This object is achieved according to the invention by a display device having the features of the claims.

According to the invention, the display device for representing three-dimensional scenes comprises at least one illumination device, at least one spatial light modulation device and at least one Bragg polarization grating. The Bragg polarization grating comprises at least one birefringent layer, incident light being deflectable at a deflection angle, or a diffraction angle, of at least 20°.

In this case, Bragg polarization gratings are now used in display devices, or displays, which may be configured as holographic as well as stereoscopic display devices, in order to be able to satisfy the properties required of display devices in a simpler and more efficient way, particularly in the case of holographic display devices. In particular, the display devices may be configured as a direct-view display, as a head-up display or as a head-mounted display.

Bragg polarization gratings form a new type of gratings, which have both typical properties of a volume grating and typical properties of a polarization grating. Consequently, correspondingly produced Bragg polarization gratings for use in display devices for representing three-dimensional scenes should have a high diffraction efficiency of up to 100%, large deflection angles of at least 20°, preferably >50°, a high polarization sensitivity, a wide angular acceptance, a wide chromatic acceptance and the capability of selecting between the zeroth diffraction order and the $\pm 1^{st}$ diffraction order on the basis of the polarization state.

As is known, the diffraction efficiency of circular polarization gratings in the case of normal light incidence on the grating decrease drastically when the grating period likewise becomes smaller. In the case of small grating periods, at least two known models of diffraction gratings must be taken into consideration, namely the Raman-Nath model and the Bragg model. The known parameters for identifying a diffraction grating are Q (Cook-Klein criterion) and $\rho$:

$$Q = \frac{2\pi\lambda d}{n\Lambda^2},$$

$$\rho = \frac{2\lambda^2}{n\Delta n\Lambda^2},$$

where $\lambda$ is the wavelength, d is the thickness of the grating, $\Lambda$ is the grating period, n is the average refractive index and $\Delta n$ is the birefringence. In this case, gratings may be considered to be "thin" when $Q<1$ and $\rho<1$. When $Q>1$ or $\rho>1$, these gratings may be regarded as "thick" and fall within the Bragg model. It has been shown that Bragg properties exist, for example, for gratings having a grating period of $\Lambda<1$ μm, a thickness of the grating of about 1 μm with a refractive index of n=1.5 to 1.7 and a value of the birefringence of $\Delta n=0.2$. If a grating has Bragg properties, this means that a maximum diffraction efficiency is achieved for a particular incidence angle of the light on the grating. This angle is known as the Bragg angle. In display devices, it is of great importance that the light as far as possible has normal incidence on the grating. However, in order to provide a maximum diffraction efficiency of a grating for normal light incidence, the grating planes must be tilted with respect to the substrate.

Furthermore, it has been shown in simulations that gratings having grating periods of 1.4 μm and 0.7 μm also cannot be referred to as "thin" gratings since the value of $\rho=$about 5 for a grating period of 0.7 μm, even if its physical thickness is small, for example ~1.5 μm. Widely known circular polarization gratings having large grating periods, i.e. $\Lambda>2$ μm, with a physical thickness likewise of 1.5 μm, may in contrast thereto be regarded as thin gratings. For example $\rho=$about 0.5, i.e. $\rho<1$, for $\Lambda=2$ μm, d=1.5 μm, n=1.5, $\Delta n=0.2$ and $\lambda=532$ nm.

It has furthermore been shown that widely known circular polarization gratings having large grating periods, i.e. $\Lambda>2$ μm, provide polarization switching between the $+1^{st}$ diffraction order and the $-1^{st}$ diffraction order depending on whether a right-circular or left-circular polarization of the incident light is provided. However, circular polarization gratings having Bragg properties, which are referred to below as Bragg polarization gratings and are intended to be used in the display device according to the invention, and small grating periods, exhibit polarization switching between the $\pm 1^{st}$ diffraction order and the zeroth diffraction order.

A different distinction to this (disclosed for example by: T. K. Gaylord and M. G. Moharam: "Thin and thick gratings: terminology clarification", Applied Optics, Vol. 20, p. 3271, 1981), for which the terms "thin" or "thick" gratings are occasionally likewise used, relates to the angular and wavelength selectivity. What matters in this case is the ratio of physical thickness d to grating period $\Lambda$ of a grating. Gratings for which $d/\Lambda<10$ are regarded as thin gratings in the sense that they have a wide angular and wavelength selectivity, while gratings for which $d/\Lambda>10$ are regarded as thick gratings in the sense that they have a narrow angular and wavelength selectivity.

The present invention in this case relates to the use of Bragg polarization gratings which have Bragg properties in the sense of the Raman-Nath model and the Bragg model, and they may in this sense be regarded as thick gratings. In the sense of wavelength selectivity, these Bragg polarization gratings may be used for different wavelengths within the visible spectrum, for example blue, green and red light, with a similar diffraction efficiency, and they therefore have a wide wavelength selectivity of $\pm 150$ nm. In accordance with their Bragg properties, these Bragg polarization gratings have a high diffraction efficiency only for a correct light incidence angle, although their angular selectivity may lie in the range of ±10 degrees or more, for example even ±17.5 degrees, and is therefore also relatively wide. The diffraction efficiency of the at least one Bragg polarization grating is in this case $\eta>80\%$, preferably $\eta>90\%$.

These Bragg polarization gratings differ in relation to angular and wavelength selectivity from Bragg gratings based on a photopolymer, which generally have a high diffraction efficiency only for a narrow wavelength range, and therefore only for either blue or green or red light, and their angular selectivity lies rather in the range of ±1 degrees for transmissive gratings and up to ±5 degrees for reflective gratings. The angular and wavelength selectivity of Bragg polarization gratings therefore does not correspond to that of a grating which is thick in this sense. For example, a Bragg polarization grating may have a thickness of between about 0.7 μm and 2 μm and a grating period $\Lambda$ of less than 1 μm. These Bragg polarization gratings have, in particular, the important Bragg properties: a high diffraction efficiency only for a correct light incidence angle and the existence only of the zeroth diffraction order and the $+1^{st}$ diffraction order or $-1^{st}$ diffraction order. Furthermore, the Bragg polarization gratings used here are intended to be produced by means of the bulk photoalignment method, so that an independency of the molecular orientation of a surface of an alignment layer may be ensured. The formation of tilted grating planes is furthermore provided in a very natural way. The director (i.e. the orientation direction) of the liquid crystals in this case lies in the plane perpendicular to the grating lines. The local birefringence does not depend on the grating plane inclination. This is a substantial advantage of photo-crosslinked liquid crystal polymers used in these gratings, which is intended to be employed here according to the invention and thus offers the possibility of using such Bragg polarization gratings efficiently for display devices.

Because of these particular advantages of a Bragg polarization grating, it may be used in particular for light deflection. Particularly by the use of at least one such Bragg polarization grating in a display device, improved display devices may now advantageously be provided since the generation, in particular holographically, of a scene or information to be represented may be carried out in a simplified way and with higher quality by highly efficient deflection of a light beam.

Further advantageous configurations and refinements of the invention may be found in the further dependent claims.

Advantageously, the Bragg polarization grating may have a grating period of $\Lambda<1$ μm.

Advantageously, at least one polarization switch may be provided, with which the polarization state of the incident light is modifiable.

For this purpose, an already known or previously available liquid crystal-based polarization switch may be used as the at least one polarization switch. By means of the at least one polarization switch provided in the display device according to the invention, the polarization state of the light coming from the at least one illumination device may be modified according to a required polarization of the light. For example, if the at least one Bragg polarization grating needs right-circularly polarized light so that the incident light can be deflected into a $-1^{st}$ diffraction order, this adjustment of a right-circular polarization state may be carried out by means of the at least one polarization switch.

To this end, the at least one Bragg polarization grating may be combined with the at least one polarization switch, and the entire arrangement of these two components may be configured as a controllable Bragg polarization grating, incident light emerging deflected or undeflected from the controllable Bragg polarization grating depending on the switching state of the latter.

In this way, it is possible to switch between the zeroth diffraction order and the $\pm 1^{st}$ diffraction order, so that the light incident on the controllable Bragg polarization grating may be deflected, or diffracted, correspondingly into the required diffraction order at a large deflection angle, preferably of $>50°$.

By means of the Bragg polarization grating, light may be deflected efficiently into a zeroth diffraction order or into a first diffraction order, or one of the two first diffraction orders, the polarization state of the light deflected into a first diffraction order being different to the polarization state of the light incident on the Bragg polarization grating. The polarization state of the incident light changes after the passage through and the deflection of light into the $\pm 1^{st}$ diffraction order, so that for example right-circularly polarized light is converted into left-circularly polarized light. Left-circularly polarized light is transmitted undeflected.

Preferably, the wavelength used of the light emitted by the illumination device may lie in the visible range, preferably between 400 nm and 700 nm. This means that, in the visible wavelength range, the at least one Bragg polarization grating has a high diffraction efficiency and can generate large deflection angles, or diffraction angles. Typically, however, the deflection angle of a Bragg polarization grating varies with the wavelength, i.e. a dispersion occurs. In some applications, it is necessary to deflect light of a plurality of wavelengths by the same angle and therefore to compensate for the dispersion. In one advantageous configuration of the invention, in the case of a color representation of scenes, at least one compensation grating element may therefore furthermore be provided in order to compensate for the dispersion of the light. For example, the Bragg polarization grating may deflect green light at a desired angle, but red and blue light at an incorrect angle because of the dispersion. In this case, at least one compensation grating element for red light and at least one compensation grating element for blue light may be provided.

In this way, a color correction of the individual RGB (red-green-blue) scenes, or subscenes, represented may be carried out so that each individual color image of the scene is generated at the same position in a field of view present in front of an observer of the scene represented. To this end, the dispersion of the individual light beams is corrected by means of the compensation grating elements for two of the three primary colors, by the compensation grating elements correspondingly deflecting the light in the desired direction so that the light beams of all colors again travel approximately parallel to one another and the individual color images are generated at the same position, and a correct color scene is therefore made possible.

In particular, volume gratings having a narrow wavelength selectivity, for example volume gratings based on photopolymer, may be used as compensation grating elements, in such a way that these volume gratings efficiently deflect only light of one color, for example only red light or only blue light. The invention is not, however, restricted to this type of compensation element.

In a further advantageous configuration of the invention, in order to generate frontlight illumination of a reflectively configured spatial light modulation device, a light guide and at least two Bragg polarization gratings may be provided, which are coupled to one another in such a way that the spatial light modulation device can be illuminated uniformly.

In a display device, the Bragg polarization grating may also be provided for uniform illumination of the at least one spatial light modulation device. This may, in particular, be advantageous when a frontlight illumination and a reflective spatial light modulation device are intended to be provided in the display device.

The light guide and the at least two Bragg polarization gratings are in this case arranged with respect to one another in the display device in such a way that the reflectively configured spatial light modulation device can be illuminated homogeneously, or uniformly. To this end, a first Bragg polarization grating may be provided for the coupling of light into the light guide. The light coupled into the light guide in this way and at a large deflection angle then propagates in the light guide by means of reflection, preferably by means of total internal reflection. For the coupling of light into the light guide, it is also possible to provide a polarization switch in combination with the Bragg polarization grating.

In order to couple the light out again suitably, and above all uniformly, of the light guide, according to the invention a second Bragg polarization grating may be provided. The Bragg polarization grating is for this purpose configured in such a way that the light propagating in the light guide by means of reflection, preferably by means of total internal reflection, can be coupled out through the entire surface of the Bragg polarization grating, so that the spatial light modulation device can be illuminated two-dimensionally and uniformly.

A polarization switch or a wave plate, which modifies the light coupled out of the light guide in its polarization state after reflection at the spatial light modulation device may advantageously be provided between the light guide and the spatial light modulation device in the light direction, so that the light incident on the light guide again can pass through it unimpeded. The Bragg polarization grating in this case acts nonsensitively on the light, now having an opposite polarization direction, coming from the polarization switch.

In a further advantageous configuration of the invention, in order to generate illumination of a transmissively configured spatial light modulation device, a light guide and at least two Bragg polarization gratings may be provided, which are coupled to one another in such a way that the spatial light modulation device can be illuminated uniformly.

A light guide in combination with at least two Bragg polarization gratings may also be provided in order to illuminate a transmissively configured spatial light modulation device. For this purpose, this light guide may be coupled to the at least two Bragg polarization gratings. One Bragg polarization grating of the at least two Bragg polarization gratings may be provided for the coupling of light into and the other of the at least two Bragg polarization gratings may be provided for the coupling of light out of the light guide. In this case as well, a polarization switch in combination with the Bragg polarization grating may be provided for the coupling of light into the light guide.

The at least two Bragg polarization gratings have the same optical properties, i.e. the same grating period and/or the same grating thickness and/or also the same deflection angle and/or also an equal inclination of the grating planes. This is advantageous in order to compensate for possibly existing chromatic aberrations, which may be present during the illumination of the spatial light modulation device with the three primary colors RGB, simultaneously by means of the Bragg polarization grating, so that additionally present compensation elements may be avoided. This applies for the illumination both of transmissive and of reflective spatial light modulation devices.

It may furthermore be advantageous for at least one optical system to be provided, the at least one optical system being provided for generating a virtual observer region, through which an observer can observe a represented scene.

An in particular holographic direct-view display, which generates a virtual observer region, comprises an illumination beam path. The display device, or the display, comprises an illumination device having at least one light source. For example, the illumination device may be configured as a backlight which generates a collimated plane wavefront that illuminates the spatial light modulation device. The collimated wavefront corresponds to a virtual light source, which illuminates the spatial light modulation device from an infinite distance. The spatial light modulation device may, however, also be illuminated with a divergent or convergent wavefront, which corresponds to a real or virtual light source at a finite distance in front of or behind the spatial light modulation device. An optical system focuses the light coming from the spatial light modulation device onto the position of a virtual observer region. If a hologram is not written into the spatial light modulation device, an image of the light source and the periodic repetitions of this image as higher diffraction orders are formed in an observer plane. If a suitable hologram is written into the spatial light modulation device, however, a virtual observer region, which may also be referred to as a virtual observer window, is formed close to the zeroth diffraction order. This is referred to below as the virtual observer region being located in a plane of the light source image. In a holographic direct-view display, a field lens, which the optical system comprises and which generates an image of the light source, is generally located close to the spatial light modulation device. An observer sees the spatial light modulation device at its actual distance, without there being imaging of the spatial light modulation device, and can observe the represented three-dimensional scene through the virtual observer region when at least one eye of the observer is located at the position of the virtual observer region.

In other preferably holographic display devices, for example head-mounted displays (HMDs), head-up displays (HUDs) or other projection displays, there may additionally be an imaging beam path. In these display devices, a real or virtual image of the spatial light modulation device is generated, which the observer sees, the illumination beam path furthermore being of importance for the generation of a virtual observer region. Both beam paths, the illumination beam path and the imaging beam path, are therefore important in this case.

In other display devices as well, for example stereoscopic display devices, the case may arise that there are an imaging beam path and an illumination beam path. In order to generate a sweet spot, a stereoscopic display device may for example comprise an optical arrangement similar to that of the aforementioned holographic displays, i.e. collimated illumination of a spatial light modulation device, and an optical system, but also additional components, for example a scattering element having a defined scattering angle. If the scattering element were removed from the display device, the optical system would generate a light source image in the plane of the sweet spot. By using the scattering element, the light is instead distributed over an extended sweet spot, which is narrower than the interpupillary distance of an observer. The illumination beam path is, however, important in order to be able to see the stereoscopic image fully without vignetting effects. A three-dimensional stereo display device may likewise have an imaging beam path, with which a spatial light modulation device is imaged at a particular distance from the observer.

Display devices may in the general case comprise lenses or other imaging elements, which influence the two beam paths, both the illumination beam path and the imaging beam path, in the optical system. For example, a single imaging element may be arranged between the spatial light modulation device and an observer, in such a way that this imaging element generates both an image of the spatial light modulation device and imaging of the light source into the observer plane.

In order, for example, to be able to generate a large field of view by means of a display device which operates with at least one virtual observer region, at least one optical system may advantageously be provided and be configured in such a way that a multiple image, constructed from segments, of the spatial light modulation device is generatable, the multiple image determining a field of view within which information, encoded in the spatial light modulation device, of a scene is reconstructable for observation through a virtual observer region.

In order to allow such multiple image of the spatial light modulation device in order to generate a large field of view (FOV), the at least one Bragg polarization grating may be combined with the at least one polarization switch and be configured as a controllable Bragg polarization grating, in one switching state of the at least one controllable Bragg polarization grating one segment, and in another switching state of the at least one controllable Bragg polarization grating a further segment of the multiple image, constructed from segments, of the spatial light modulation device is generatable.

In an alternative configuration of the invention, in order to generate a large field of view, a light guide may be provided, by means of which and in combination with the at least one optical system, the multiple image, constructed from segments, of the spatial light modulation device is generatable. The light guide may for this purpose be configured to be planar, or flat, or also curved. It is possible for the light guide to be configured to be curved only in subregions.

Advantageously, the light coupled into the light guide may propagate in the light guide by reflection, preferably by total internal reflection, and may be capable of being coupled out of the light guide by means of at least one controllable Bragg polarization grating. As an alternative, instead of by total internal reflection, the light may also propagate inside the light guide by means of a dielectric layer stack which acts as an angle-selective reflector. The dielectric layer stack may be provided at the boundary surface of the light guide, so that the light is deflected, or reflected, at the dielectric layer stack by the required angles so that the light can propagate as required inside the light guide and correspondingly be coupled out of the light guide by means of the at least one controllable Bragg polarization grating.

For this purpose, the at least one controllable Bragg polarization grating may be formed from a Bragg polarization grating and a polarization switch. The polarization switch may advantageously be configured as a structured polarization switch. By means of the structured polarization switch, the polarization direction of the light propagating in the light guide may be locally modified, so that it is possible to define where, or at which position in the light guide, the light must be coupled out in order that a large field of view can be generated. In this way, it is therefore possible to achieve the effect that the light is coupled out of the light guide at the required position for imaging of the spatial light modulation device, and a multiplicity of imagings of the spatial light modulation device is accordingly generated. By this multiplicity of imagings of the spatial light modulation device, a large field of view is generated by successive arrangement of these imagings.

In a further advantageous configuration of the invention, at least one controllable Bragg polarization grating may be provided for the coupling of light into the light guide, the at least one controllable Bragg polarization grating being formed from a Bragg polarization grating and a polarization switch, the incident light being diffractable at a light incidence angle into a first diffraction order by means of the controllable Bragg polarization grating. The light incidence angle may have a value which is greater than the critical angle of total internal reflection or which is adapted to the reflection angle of a dielectric layer stack.

A controllable Bragg polarization grating may also be provided for the coupling of light into the light guide. The light incident on the Bragg polarization grating is diffracted into a first diffraction order according to the way in which the diffractive structure, or the grating planes of the grating structure of the Bragg polarization grating, is defined on the latter. In this way, a light incidence angle of the light is generated at which the light preferably propagates in the light guide by total internal reflection.

Instead of controllable Bragg polarization gratings which make it possible to switch between two states, in which light is either coupled or not coupled into the light guide, it is also possible to use a passive (noncontrollable) Bragg polarization grating if the light is always intended to be coupled into a light guide, specifically at the same angle.

Furthermore, a stack of at least two controllable Bragg polarization gratings may advantageously be provided, the at least two Bragg polarization gratings respectively being coupled with a polarization switch, different light incidence angles in the light guide being generatable and the light propagating in the light guide by reflection, preferably by total internal reflection.

A stack of at least two Bragg polarization gratings in combination with at least two polarization switches may be provided as controllable coupling of the light into the light guide. In this way, it is possible to generate different light incidence angles, at which the light correspondingly propagates in the light guide. For example, the grating periods and the inclination angle, adapted to the period, of the grating planes may be different for the at least two Bragg polarization gratings.

The at least two Bragg polarization gratings are arranged with respect to one another in such a way that their grating planes of the grating structures form a defined angle with one another. This means that the grating planes of the two Bragg polarization gratings are, for example, arranged parallel to one another or mirror-inverted or rotated by 90° with respect to one another, although other angles are also possible. The polarization switches may be driven in such a way that they modify the polarization state of the incident light according to the required polarization, when necessary, so that the light from at least one of the Bragg polarization gratings, or from a combination of a plurality of Bragg polarization gratings, is deflected and is incident into the light guide at a required angle. The grating period determines the angle at which the light propagates in the light guide. In the light guide, the light then propagates as this angle until it is intended to be coupled out. The light may therefore be coupled into the light guide at different angles by providing Bragg polarization gratings having a different grating period, so that the light can propagate in the light guide at different angles. The orientation of the grating planes of the individual Bragg polarization gratings with respect to one another determines the direction in which light propagates in the light guide. Using two mirror-symmetrically arranged Bragg polarization gratings, for example, the light may propagate in the light guide in opposite directions from the coupling position. Such an arrangement would, for example, in a head-mounted display, make it possible to couple light into a light guide at the level of the nose and then direct it selectively to the left eye or to the right eye. The coupling of light out of the light guide may, for example, likewise be carried out by a Bragg polarization grating, but also by means of a volume grating, both types of grating needing to be formed in such a way that they are configured for the required light propagation angle of the light.

In another advantageous configuration of the invention, at least one Bragg polarization grating may be coupled with at least one polarization switch.

In order, for example, to generate a preferably three-dimensional scene to be represented in a large field of view, individual tiles of the scene to be generated or segments of the multiple image of the spatial light modulation device may be generated.

By adjustment of the polarization with the polarization switch, the Bragg polarization grating deflects light either into the zeroth diffraction order or into a first diffraction order. In this way, with a single Bragg polarization grating and a single polarization switch, two tiles or segments of the multiple image of the spatial light modulation device may respectively be generated for example either in the vertical direction or in the horizontal direction.

In one advantageous configuration of the invention, it is also possible to provide at least two Bragg polarization gratings which respectively comprise a grating structure having grating planes, the two Bragg polarization gratings being arranged with respect to one another such that their grating planes form a defined angle with one another. In addition, the grating periods of the at least two Bragg polarization gratings may be different to one another. In other words, the at least two Bragg polarization gratings may have different grating periods.

This means that in each case one Bragg polarization grating is coupled with one polarization switch. The grating planes of the grating structures of the Bragg polarization gratings have an angle with respect to one another, that is to say they are for example arranged parallel to one another or mirror-inverted or else rotated by 90° with respect to one another, although other angles are also possible. By combination of two Bragg polarization gratings which have an angle of 90 degrees with respect to one another, two tiles or segments of the multiple image of the spatial light modulation device may respectively be generated for example in the vertical direction or in the horizontal direction, i.e. four tiles or segments in total, since the light of each of the two Bragg polarization gratings is deflectable selectively into the zeroth diffraction order and into a first diffraction order. Four combinations are therefore possible in total (0 horizontal/0 vertical, 0 horizontal/1 vertical, 1 horizontal/0 vertical or 1 horizontal/1 vertical). The generation of the tiles or segments of the multiple image of the spatial light modulation device may be carried out sequentially. Two Bragg polarization gratings, which are arranged mirror-invertedly, may for example generate three tiles or segments of a multiple image of the spatial light modulation device in the horizontal direction or in the vertical direction. Using Bragg polarization gratings having a different grating period, different deflection angles may also be generated in the same direction, and for example the number of tiles or segments in the horizontal direction or in the vertical direction may therefore be increased.

The generated segments of the multiple image of the spatial light modulation device may be arranged adjacent to one another substantially without gaps. Preferably, the generated segments of the multiple image of the spatial light modulation device may partially be superimposed or overlap with one another. It may be possible to take regions of the overlaps into account during the encoding of information of the scene to be generated into the spatial light modulation device.

The at least one Bragg polarization grating in combination with at least one polarization switch and at least one optical system may be provided for generating the multiple image, constructed from segments, of the spatial light modulation device.

Furthermore, the at least one Bragg polarization grating in combination with the at least one optical system may be provided for coarse tracking of the virtual observer region in the x direction, y direction (lateral directions) and/or z direction (axial direction of the display device).

The use for coarse tracking of a virtual observer region is also possible independently of the multiple image, constructed from segments, of the spatial light modulation device—and also, for example, in the display devices which carry out simple imaging or even no imaging of the spatial light modulation device, and therefore in so-called direct-view displays.

Bragg polarization gratings may be provided in particular for coarse tracking of the virtual observer region. In this case, the coarse tracking may be carried out not only in a lateral direction, but also in the z direction, or in the axial direction, away from the observer or toward the observer. The fine tracking of the virtual observer region may in a known way be carried out by means of liquid crystal gratings (LCGs). The liquid crystal gratings may be combined with the Bragg polarization gratings in order to extend the limited deflection angle of the liquid crystal gratings. In this way, the angle required for the tracking of the virtual observer region by the combination of liquid crystal gratings and Bragg polarization gratings may be substantially increased, for example almost doubled.

In one embodiment, the at least one optical system may comprise at least two conventional volume gratings, for example based on photopolymers, which have a different, respectively narrow angular selectivity and which are configured as field lenses having a different lateral focal point or different focal length. By means of the at least one polarization switch, the polarization of the light is adjusted in such a way that the at least one Bragg polarization grating directs light either into the zeroth diffraction order or into a first diffraction order. The incidence angles of the volume gratings are adjusted in such a way that one volume grating focuses light from the zeroth diffraction order of the at least one Bragg polarization grating with a high diffraction efficiency, and the second or further volume grating focuses light from the first diffraction order respectively of a Bragg polarization grating with a high diffraction efficiency.

In a further advantageous configuration of the invention, at least one lens element may furthermore be provided, which is configured as a Bragg polarization grating and is coupled with a polarization switch.

The at least one lens element as a Bragg polarization grating may, for example, comprise a grating structure having different local grating periods.

A Bragg polarization grating provided in the display device could therefore itself also be configured as a lens element, or as a focusing element. The Bragg polarization grating therefore has a local grating period which depends on the position on the Bragg polarization grating and corresponds to a lens function. Since the Bragg polarization grating deflects either into the zeroth diffraction order or into the first diffraction order, in the case of the zeroth diffraction order, for example, the lens function of the Bragg polarization grating would be switched off, and in the other case of the first diffraction order the lens function of the Bragg polarization grating would be switched on.

Preferably, the at least one lens element may be provided as a field lens for tracking of the virtual observer region in the z direction.

At least one controllable Bragg polarization grating may also be used as a switchable or controllable element in a display device in combination with elements for coarse tracking of a virtual observer region, in which case the coarse tracking elements may also comprise or contain lens functions. For example, these coarse tracking elements may be configured as at least two volume gratings, for example based on photopolymers, which have a narrow angular selectivity and which are configured as field lenses having a different lateral focal point or different focal length.

By means of the at least one polarization switch, the polarization is adjusted in such a way that the at least one Bragg polarization grating directs light either into the zeroth diffraction order or into a first diffraction order. In such a case, the at least one Bragg polarization grating itself would act as a prism which deflects incident light at two different angles depending on the switching state of the polarization switch coupled to it, these deflection angles being adapted to the angular acceptance of at least two different volume gratings following in the beam path, so that either one volume grating or the other volume grating is addressed. In the case of using at least two Bragg polarization gratings, these may in turn be arranged with respect to one another in such a way that their grating planes form a defined angle with one another and/or they may have different grating periods. One Bragg polarization grating may for example deflect light with a direction of +45° and a second Bragg polarization grating may deflect light at −45° with respect to the horizontal, respectively by an angle of 30°, in which case two volume grating field lenses may be configured in such a way that one volume grating field lens thereof focuses light which is incident in the +45° direction and the other volume grating field lens focuses light which is incident in a −45° direction at an angle of 30° with a high diffraction efficiency.

For a color representation of a scene, use may also advantageously be made of the fact that a Bragg polarization grating deflects light of different wavelengths within the visible range with a high diffraction efficiency but at different angles. Volume grating field lenses based on photopolymers, on the other hand, have a narrow angular and wavelength selectivity. For a triplet of RGB volume grating field lenses having the same focal point, the light incidence angles at which the lenses deflect with a high diffraction efficiency may therefore be configured in such a way that they match the dispersion of the Bragg polarization grating. For example, a Bragg polarization grating deflects blue light by 35°, green light by 40.5° and red light by 48.7° in the first diffraction order. Three volume grating field lenses having the same focal points are then configured in such a way that the blue volume grating field lens deflects light obliquely incident at 35°, the green volume grating field lens deflects light incident at 40.5° and the red volume grating field lens deflects light obliquely incident at 48.7° with a high diffraction efficiency.

Again, for example, at least two Bragg polarization gratings may be used. These are arranged with respect to one another in such a way that their grating planes form a defined angle with one another and/or they may have different grating periods. Each Bragg polarization grating may respectively be assigned a triplet of RGB volume grating field lenses, the different triplets having different lateral focal points or different focal lengths.

If, however, the Bragg polarization grating itself is configured as a field lens, compensation grating elements may in turn be provided in order to correct the dispersion. As an alternative, a separate Bragg polarization grating may respectively be provided for red, green or blue light, so that for example when using blue light, the Bragg polarization grating provided for this purpose is operated in the first diffraction order and the Bragg polarization gratings provided for red and green light are operated in the zeroth diffraction order.

Therefore, in a display device according to the invention, a field lens or a stack of field lenses for a color representation (RGB—three field lenses) of a preferably three-dimensional scene, which is provided for coarse tracking and/or for tracking of the virtual observer region in the z direction, i.e. in the axial direction of the display device, may itself also be configured as a controllable Bragg polarization grating or a stack of at least two controllable Bragg polarization gratings, of which one Bragg polarization grating respectively is selectively operated in the first diffraction order or the zeroth diffraction order. The switching for the respective Bragg polarization grating into the required polarization of the light is carried out by means of the polarization switch coupled to it. Of course, controllable Bragg polarization gratings may also be used for coarse tracking of the virtual observer region in a lateral direction, i.e. in the x direction and/or in the y direction, or in the horizontal and/or vertical direction. For fine tracking of the virtual observer region, for example, liquid crystal gratings (LCGs) may furthermore be used. Liquid crystal gratings, which have a limited light deflection angle, may therefore be combined with controllable Bragg polarization gratings in order to increase the light deflection angle.

Possible applications of controllable Bragg polarization gratings as deflection elements in combination with angular-selective elements or themselves as lens elements for coarse tracking of a virtual observer region will be explained below.

For example, controllable Bragg polarization gratings may be used in a head-up display which allows switching between one or more fixed depth planes.

In a means of transport, for example a motor vehicle, it is sometimes necessary to display both objects which are very far away from the driver or operator of the means of transport, for example traffic signs and warnings on the street, and objects which are located very close to the driver, for example operating elements of the means of transport.

A head-up display (HUD) may for example comprise, as an optical element, a volume grating which is configured as a lens element having a particular focal length and generates an image at a fixed distance. The HUD could, however, also comprise a stack of a plurality of volume gratings, example two volume gratings, which have different focal lengths. By providing at least one controllable Bragg polarization grating in the HUD, because of the angular selectivity of the volume gratings, one of the volume gratings could be selected according to whether the zeroth diffraction order or the first diffraction order of the at least one controllable Bragg polarization grating is used, and light could correspondingly be directed onto this selected volume grating. For example, it could be possible to switch between an image of a spatial light modulation device at a distance of 70 cm from the driver or an image at a distance of 5 m from the driver. Such switching between different distances of an image from the driver may be used for a stereoscopic HUD display device. Such switching between different distances of an image from the driver may also be advantageous for a holographic HUD display device which has a virtual observer window and makes it possible to represent a three-dimensional scene holographically, since the depth plane of the image of the spatial light modulation device has an influence on the size of the subholograms used for reconstructing a scene and therefore on the computational effort for determining a hologram to be encoded into the spatial light modulation device. A three-dimensional scene lying far away may therefore be calculated in a simpler way with an image, located far away, of the spatial light modulation device, and a three-dimensional scene located close to the driver may be calculated more easily with an image close to the spatial light modulation device.

As when using volume grating field lenses for coarse tracking of a virtual observer region, a triplet of RGB volume grating lenses may in turn also be addressed by a single Bragg polarization grating when the light incidence angles of the volume grating lenses are adapted to the dispersion of the Bragg polarization grating. For example, one triplet of RGB volume grating lenses may therefore generate an image of a spatial light modulation device at a distance of about 70 cm from the driver or observer, and another triplet may generate an image of a spatial light modulation device at a distance of 5 meters from the driver or observer, it being possible to switch between the two triplets by means of at least one controllable Bragg polarization grating.

As an alternative to using the combination of at least one controllable Bragg polarization grating with at least one angular-selective grating element, at least one controllable Bragg polarization grating may in turn itself have a lens function(s) with a different focal length. In this case as well, it is possible to provide compensation grating elements for correcting the dispersion of the Bragg polarization grating or separate controllable Bragg polarization gratings respectively for one wavelength.

Furthermore, controllable Bragg polarization gratings may be used in a stereoscopic head-mounted display (HMD) for switching between at least two depth planes for an object. Switchable optical elements may also be provided for a stereoscopic HMD in order to displace the depth plane of the represented objects.

Such a multifocal HMD may comprise a gaze tracking device. It is therefore possible to detect which object of a represented three-dimensional scene an observer is deliberately looking at, or at this moment is focusing on. If, for example, the depth position of this object focused on can be determined from a three-dimensional model of the scene, the depth position of an image of a spatial light modulation device may be selected from a plurality of possible depth positions, in such a way that this depth position lies as close as possible to the depth position of the object. The selection from a plurality of possible depth positions may in this case be carried out with at least one controllable Bragg polarization grating. This at least one controllable Bragg polarization grating then addresses volume gratings provided in the HMD, which have different lens functions and have a respective angular selectivity.

Again, a triplet of RGB volume gratings may respectively be adapted to the dispersion of the Bragg polarization grating.

As an alternative, this procedure may also be carried out with at least two controllable Bragg polarization gratings, which themselves have different lens functions.

Again, in this case compensation grating elements may be provided in order to correct the dispersion, or separately controllable Bragg polarization gratings may be provided for one color, respectively.

When adjusting the depth plane, for example, a coarse adjustment of the depth position by a Bragg polarization grating may also be combined in a varifocal HMD with a fine adjustment of the depth position by another variable focus element, for example at least one liquid crystal grating (LCG).

For example, such a stereoscopic HMD may comprise a light guide. Before the coupling of light into the light guide, a spatial light modulation device is imaged at infinity. In the light outcoupling region of the light guide, a plurality of volume gratings which have lens functions with different focal lengths are provided. One of these volume gratings is addressed by providing a controllable Bragg polarization grating, which is for example likewise provided in the light outcoupling region of the light guide. It is also possible for a plurality of controllable Bragg polarization gratings having different lens functions to be provided or arranged in the light outcoupling region of the light guide. The addressing or use of gratings having different lens functions leads to imaging of the spatial light modulation device at different distances from the observer, or at different lateral positions, in order to increase the field of view by multiple imaging of the spatial light modulation device after outcoupling from the light guide.

Measures such as are described in other configurations of the invention may again be carried out in order to correct the dispersion.

The use of controllable Bragg polarization gratings is not, however, intended to be restricted to HMD display devices having light guides; controllable Bragg polarization gratings may also be used in other display devices.

Furthermore, usability in an HMD is also not intended to be restricted to stereoscopic HMDs, so that they may also be used in other three-dimensional displays, for example holographic HMDs or display devices.

Switching between two or more depth planes in an HMD or an HUD, or in another three-dimensional display device, may in particular also be advantageous for holograms which are encoded into a spatial light modulation device by means of single parallax. Because of single parallax encoding of holograms, however, the depth region in which a high-resolution representation of the three-dimensional scene is possible is restricted. By switching between different depth planes of the three-dimensional image, this depth range may advantageously be extended.

The display device according to the invention may be configured as a holographic display device or as a stereoscopic display device.

In particular, the display device according to the invention may be configured as a direct-view display, as a head-up display or as a head-mounted display. Two such display devices according to the invention may form a head-mounted display, such a display device respectively being assigned to a left eye of an observer and to a right eye of the observer.

There are now various possibilities for advantageously configuring the teaching of the present invention and/or combining the described exemplary embodiments or configurations with one another. In this regard, on the one hand, reference is to be made to the patent claims dependent on the independent patent claims, and on the other hand to the following explanation of the preferred exemplary embodiments of the invention with the aid of the drawings, in which generally preferred configurations of the teaching are also explained. The invention is in this case explained in principle using the exemplary embodiments described, but is not intended to be restricted to the latter.

It should briefly be mentioned that elements/parts/components which are the same also have the same references in the figures.

DETAILED DESCRIPTION OF THE INVENTION

In many optical applications, particularly in the field of display devices, or displays, for representing in particular three-dimensional objects or scenes, normal light incidence on optical elements is required. In the case of diffraction gratings, furthermore, high diffraction efficiencies and efficient deflection of the incident light are simultaneously sought. As has been shown, Bragg polarization gratings have a high diffraction efficiency in the case of normal light incidence. In this case, various concepts for the generation of such Bragg polarization gratings are already known. For example, one method for producing a grating is based on reactive mesogens, which are combined with a photostructured alignment layer (PAL), the rings or grating planes being oriented perpendicularly to the substrate of the grating. In this case, the orientation of the liquid crystal director always remains in the plane parallel to the substrate. This, however, leads to a reduction of the local birefringence of the grating at large inclination angles $\alpha_B$.

Figure 1:
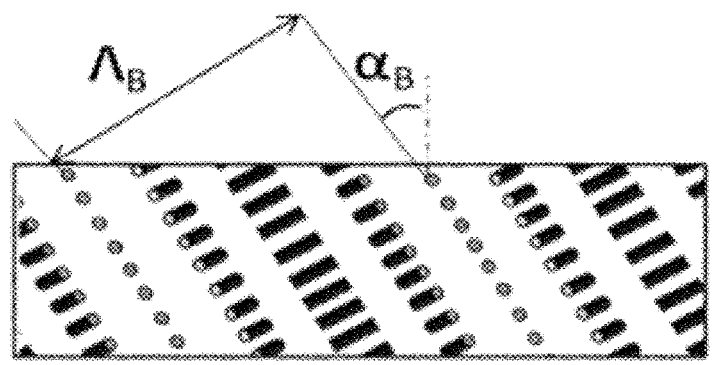
FIG. 1: shows the molecular structure of a Bragg polarization grating in a schematic representation.

However, the Bragg polarization grating now employed here is based on another production method. In this case, the Bragg polarization grating is generated by means of bulk photoalignment. This procedure ensures that there is independency of the molecular orientation from a structured surface of the alignment layer. Furthermore, it allows formation of inclined grating rings, or grating planes, in a simple and natural way, as is shown in FIG. 1. The introduction of the grating by exposure is carried out with oblique light incidence, so that a complex three-dimensional orientation of the liquid crystal polymer is induced. The reference $\Lambda_B$ is intended to represent the grating period of the Bragg polarization grating generated in this way. Before the holographic exposure, the material for the Bragg polarization grating is rotated at a defined angle $\varphi$ so that the material is exposed with an oblique interference pattern. The liquid crystal director, however, in this case lies in the plane perpendicular to the rings, or grating planes, as may be seen in FIG. 1. In this way, the local birefringence does not depend on the inclination of the rings. This advantage is intended to be used here for various applications in a display device, or a display.

In this way, Bragg polarization gratings are generated which have a high diffraction efficiency of about 98%, i.e. close to 100%, this being with normal light incidence on the Bragg polarization grating during operation.

Figure 2:
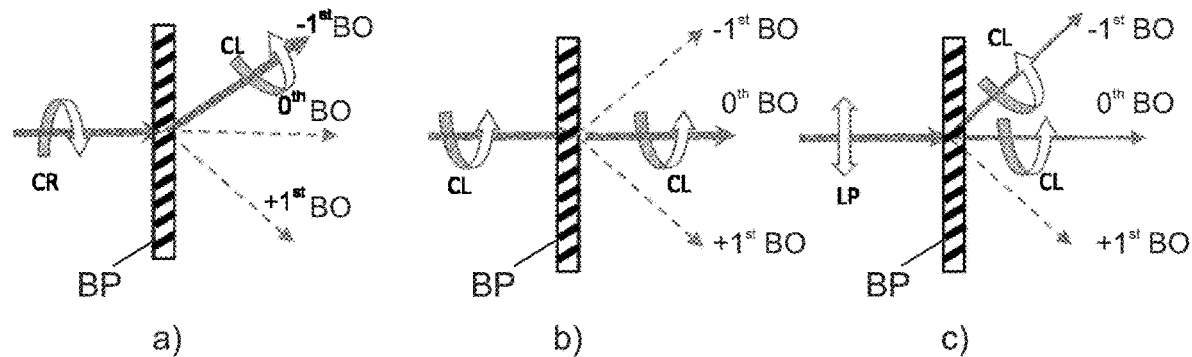
FIG. 2: shows the behavior of a Bragg polarization grating in different polarization states in a schematic representation.

FIG. 2 shows the behavior of such a Bragg polarization grating in different polarization states with normal light incidence in a schematic representation. A Bragg polarization grating BP which is illuminated with right-circularly polarized light CR is represented in illustration a). The Bragg polarization grating BP then diffracts the incident light into the $-1^{st}$ diffraction order ($-1^{st}$ BO). During the diffraction of the right-circularly polarized light by the Bragg polarization grating BP, this light is converted into left-circularly polarized light CL. A diffraction efficiency of about 98% is achieved in this $-1^{st}$ diffraction order, so that almost 100% of the light is deflected into this diffraction order and there is nearly no light loss. This means that no light, or nearly no light, is deflected or diffracted into the zeroth diffraction order and into the $+1^{st}$ diffraction order. Illustration b) of FIG. 2 shows the case in which left-circularly polarized light CL is incident on the Bragg polarization grating BP as normal light incidence. This polarized light is transmitted by the Bragg polarization grating BP without diffraction, and is therefore directed into the zeroth diffraction order ($0^{th}$ BO). In this case, the polarization state of the light does not change when passing through the Bragg polarization grating. This means that the light is still left-circularly polarized even after passing through the Bragg polarization grating BP.

In illustration c) of FIG. 2, on the other hand, linearly polarized light LP is incident on the Bragg polarization grating BP. In this case, the light is diffracted approximately in almost equal parts into the $-1^{st}$ diffraction order ($-1^{st}$ BO) and into the zeroth diffraction order ($0^{th}$ BO). The diffraction efficiency is therefore distributed between these two diffraction orders.

In general terms, Bragg polarization gratings therefore have the property that they deflect light having one circular polarization state into a first diffraction order and light having another circular polarization state into the zeroth diffraction order. This means that it is not always necessary that right-circularly polarized light must be directed into a first diffraction order and that left-circularly polarized light is directed into the zeroth diffraction order, as explained in FIG. 2. Rather, depending on the configuration of the Bragg polarization grating, it may also be the other way round.

Because of their small thickness of from about 0.7 μm to about 2 μm, usually from about 1.2 μm to about 1.8 μm, preferably about 1.5 μm, the Bragg polarization gratings used here have a wide spectral acceptance and a large angular acceptance. There is therefore a high diffraction efficiency of the Bragg polarization grating in the green as well as in the red and blue wavelength ranges, which in each case is more than 90%. The Bragg polarization grating may therefore be used in the entire visible spectral range, i.e. for wavelengths A of from around 400 nm to around 700 nm. The angular acceptance (FWHM—Full Width at Half Maximum) of the Bragg polarization grating is typically approximately 35° (i.e. ±17.5°). This is substantially higher than the angular acceptance of a volume grating based on photopolymer, which is rather in the low single-digit degree range, i.e. is ≤±5°.

As shown in the following FIGS. 3 to 5, such a Bragg polarization grating may therefore be used for the efficient deflection of light, large deflection angles of more than 50° being achievable. These figures show basic applications of a Bragg polarization grating, FIGS. 6 to 16 showing special exemplary embodiments of the use of Bragg polarization gratings.

Figure 3:
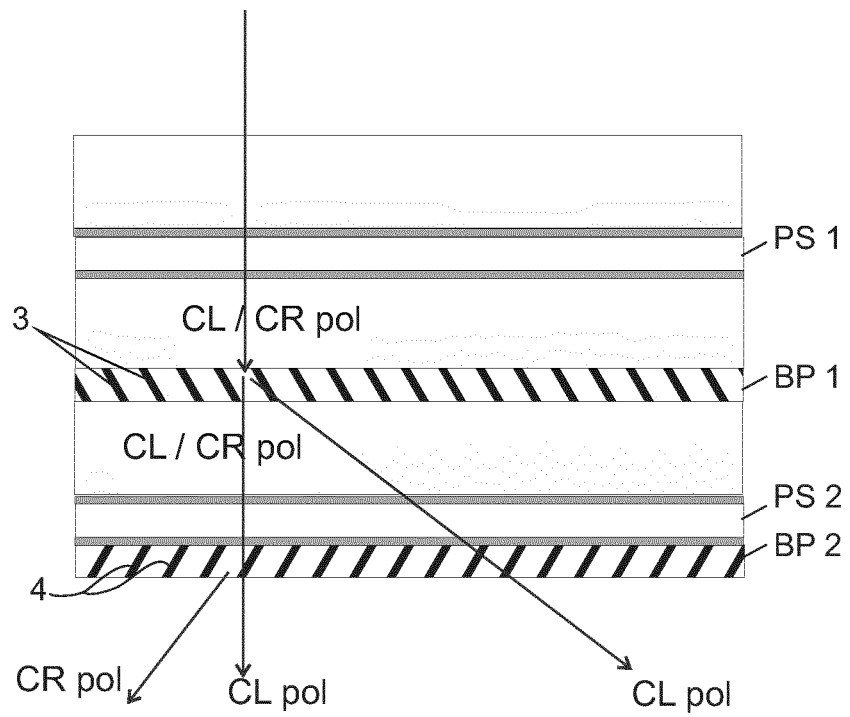
FIG. 3: shows an outline representation of an optical structure according to the invention for light deflection.

FIG. 3 illustrates an optical structure according to the invention for light deflection in an outline representation. This optical structure comprises a first Bragg polarization grating BP1 and a second Bragg polarization grating BP2. Furthermore provided are a first polarization switch PS1, which is assigned to the first Bragg polarization grating BP1, and a second polarization switch PS2, which is assigned to the second Bragg polarization grating BP2. In each case, one Bragg polarization grating and one polarization switch form a controllable Bragg polarization grating. The first Bragg polarization grating BP1 comprises a grating structure having grating planes 3, the grating planes 3 being arranged obliquely in the grating, or being tilted in a defined direction. Here, these grating planes 3 are tilted toward the left. The second Bragg polarization grating BP2 likewise comprises a grating structure having grating planes 4, these grating planes 4 also being arranged obliquely, or tilted in a defined direction. These grating planes 4, however, are arranged mirror-invertedly with respect to, or at an angle with respect to, the grating planes 3 of the first Bragg polarization grating BP1. The direction in which the grating planes are inclined and the rotation sense of the grating (whether the liquid crystal molecules rotate in the grating with or counter to the clockwise sense within a grating period), decide the direction in which the Bragg polarization grating deflects in the case of the first diffraction order and the polarization state for which the Bragg polarization grating directs into the first diffraction order. If only polarized light is incident on this stack of Bragg polarization gratings BP1, BP2 in combination with the polarization switches PS1, PS2, this light is diffracted, or deflected, respectively either into the zeroth diffraction order or into a first diffraction order by the individual Bragg polarization gratings, according to the given polarization. If, as may be seen, linearly polarized light is now incident on the first polarization switch PS1, which is switched in such a way that it converts the light into right-circularly polarized light, this light is converted by the first Bragg polarization grating BP1 into left-circularly polarized light and is diffracted into the $-1^{st}$ diffraction order. This light then passes without deflection through the second polarization switch PS2, which is in the OFF state, and the second Bragg polarization grating BP2. Already right-circularly polarized light may also be incident on the first polarization switch PS1, although this should then be in the OFF state so that no change in the polarization takes place. If no deflection of the light is required, both polarization switches PS1 and PS2 may be in an OFF state, left-circularly polarized light being intended to be incident on the first polarization switch PS1 so that the light is directed without deflection through the grating stack into the zeroth diffraction order. If deflection of the light into the $+1^{st}$ diffraction order is desired, however, the polarization switch PS1 may be in an OFF state, left-circularly polarized light likewise being intended to be incident on it so that this light can pass undeflected through the first Bragg polarization grating BP1. The second polarization switch PS2 is then in an ON state, so that the light incident on it is converted from left-circularly into right-circularly polarized light and is diffracted by the second Bragg polarization grating BP2 into the $+1^{st}$ diffraction order nearly without light loss. In this way, the light can be directed in three different directions. Switching between different deflection directions is therefore possible by means of a controllable Bragg polarization grating stack.

Figure 4:
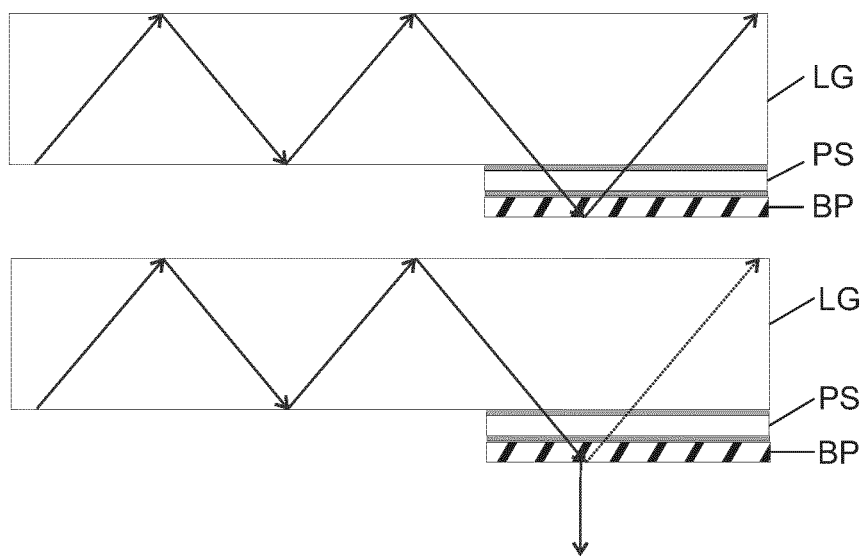
FIG. 4: shows an outline representation of a light guide and a Bragg polarization grating for the coupling out of light.

FIG. 4 shows a section of an optical structure consisting of a light guide LG and a Bragg polarization grating BP. The Bragg polarization grating BP is in this case used for the coupling of light out propagating in the light guide LG. For the coupling of light out of a light guide, it is previously known, for example, to use volume gratings which are configured for a defined angle of incidence of the light. Now, Bragg polarization gratings may also be used for the coupling out of light since, although they require a certain polarization of the light, they nevertheless have a wide angular acceptance. To this end, the Bragg polarization grating BP is combined with a polarization switch PS, which is provided for modifying the polarization of the light.

In the upper illustration of FIG. 4, the light propagates with a defined polarization in the light guide LG, no coupling of the light out of the light guide LG being intended to take place at the position of the Bragg polarization grating BP, so that the polarization switch PS is in an OFF state, i.e. the polarization of the light incident on it, for example left-circularly polarized light, is not modified. The light therefore passes undeflected through the Bragg polarization grating BP, is incident on the surface at an oblique angle and continues to propagate in the light guide LG by total internal reflection or by reflection at a dielectric layer stack, which is applied on a boundary surface of the light guide LG.

A coupling out of light propagating in the light guide LG at a position of the light guide LG is shown in the lower illustration of FIG. 4, this being represented only in a simple way. There, however, the polarization switch PS is in an ON state so that it modifies the polarization of the incident light. If the light is propagating in the light guide LG with a right-circular polarization, the polarization switch PS modifies the light incident on it into left-circularly polarized light so that this light is diffracted, or deflected, when passing through the Bragg polarization grating BP. Because of the diffraction or deflection, the light is then incident on the surface of the light guide LG nearly normally or at small angles, so that total internal reflection no longer occurs at this surface, or reflection no longer occurs at the dielectric layer stack. The light is therefore coupled out of the light guide LG.

The gratings may also be reflectively configured and coupled out light on the opposite side of the light guide.

At least one Bragg polarization grating may also be used for generating color information, for example for generating a colored object or scene with a display device. One optical structure suitable for this purpose is shown in outline in FIG. 5. This optical structure also comprises a stack 5 of compensation grating elements, which is provided in order to correct the dispersion of the light which occurs. The stack 5 comprises two volume gratings $5_B$ and $5_R$. The compensation grating element or the volume grating $5_B$ is provided in order to correct the different diffraction of blue light B with respect to green light G, the compensation grating element or the volume grating $5_R$ being provided in order to correct the different diffraction of red light R with respect to green light G. In this case, it should be assumed that green light G is diffracted in the correct direction after passing through the optical structure of FIG. 5, so that only the directions of the red and blue light need to be corrected by means of the compensation grating elements $5_B$ and $5_R$. The compensation grating elements $5_B$ and $5_R$ are passive compensation grating elements, and are configured for a particular incidence angle of the red light and the blue light, respectively.

The optical structure shown in FIG. 5 is again a light guide similarly as in FIG. 4. Light of all three primary colors RGB is intended to propagate in the light guide at the same angle and to be coupled selectively out of the light guide, but to continue to propagate at the same angle likewise after the coupling out for RGB. The arrangement consisting of a Bragg polarization grating and compensation grating elements is therefore intended overall to deflect red, green and blue light at the same angle. Such a stack consisting of a Bragg polarization grating and compensation grating elements may correspondingly also be used for deflecting red, green and blue light at the same angle in arrangements other than a light guide.

Figure 5:
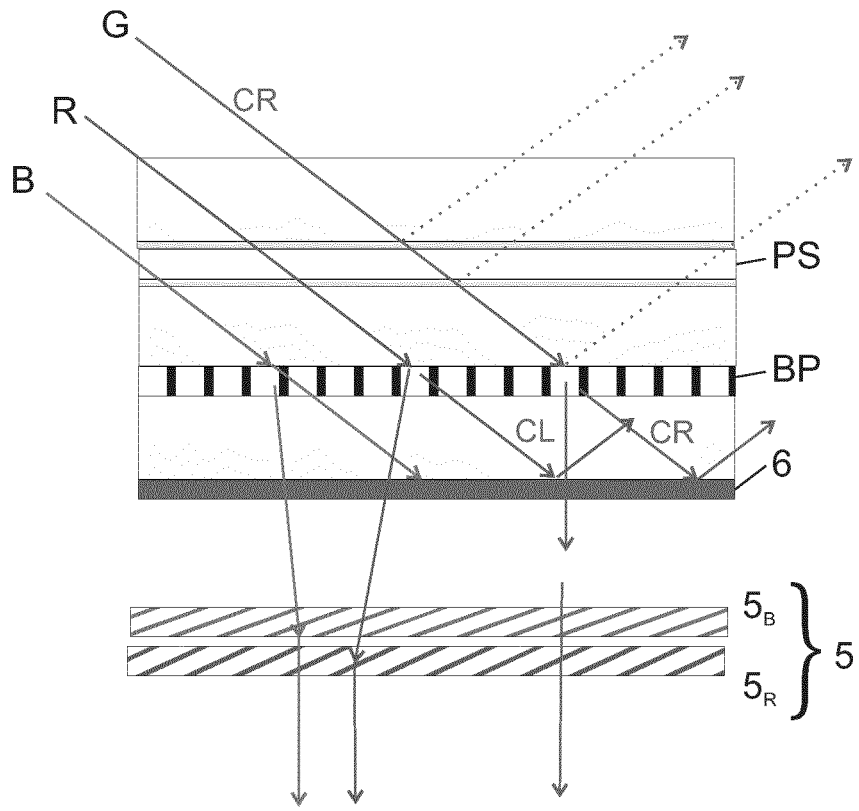
FIG. 5: shows an outline representation of an optical structure according to the invention for colored generation of information in combination with a dispersion correction.

As may be seen in FIG. 5, red light R, green light G and blue light B are respectively incident on a polarization switch PS, which may be either in an OFF state or in an ON state. The light incident on the polarization switch PS is right-circularly CR polarized in this exemplary embodiment. If the polarization switch PS is then in an OFF state, the right-circularly polarized light passes through this polarization switch PS without changing its polarization, travels through a Bragg polarization grating BP following in the light direction and is incident at an oblique angle on the surface of a light guide 6. From this surface of the light guide 6, regardless of at which wavelength, the light is correspondingly reflected by total internal reflection or by reflection at a dielectric layer stack and propagates further in the light guide 6. If the polarization switch PS is now switched to an ON state, the right-circularly polarized light is converted into left-circularly CL polarized light. The left-circularly polarized light of the corresponding color RGB is incident on the Bragg polarization grating BP and is correspondingly diffracted, or deflected, by it. The deflected light is then incident on the surface of the light guide 6 either normally or at a small angle. Because of the angle of incidence on the surface of the light guide 6 being modified by the deflection in the Bragg polarization grating, total internal reflection, or reflection, does not take place at a dielectric layer stack and the light is coupled out of the light guide 6 for all three primary colors. As may be seen in FIG. 5, however, the red light R, the green light G and the blue light B are deflected in different directions because of the dispersion. Therefore, for example, the green light G is coupled out of the light guide 6 perpendicularly to its surface. The blue light B and the red light R are, however, respectively coupled out obliquely at a small angle of the light guide 6. In order that the light of different colors is nevertheless deflected in the same direction, the two compensation grating elements $5_B$ and $5_R$ are provided after the coupling out of the light guide 6 in the light propagation direction. These compensation grating elements $5_B$ and $5_R$, or the compensation grating stack 5, realign the light beams of the blue light and of the red light parallel to the green light, i.e. the light of the red wavelength and the light of the blue wavelength are deflected in the required direction by the compensation grating element $5_B$ and $5_R$ configured for the corresponding color and angles. In this way, accurate and efficient representation of color information may also be achieved.

Figure 6:
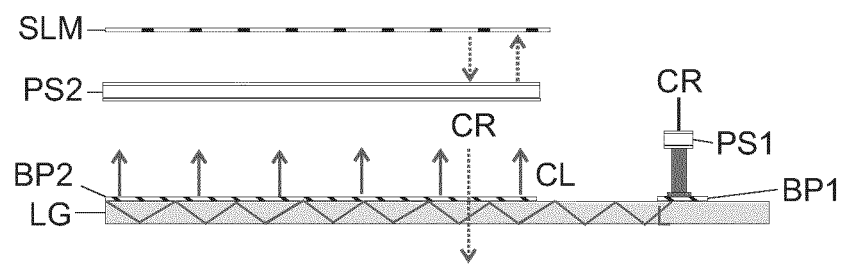
FIG. 6: shows illumination according to the invention of a spatial light modulation device in a schematic representation.

FIG. 6 shows illumination of a spatial light modulation device SLM provided in a display device by using controllable Bragg polarization gratings. In this exemplary embodiment, the spatial light modulation device SLM (referred to below only as SLM) is reflectively configured. In order to illuminate the SLM, a light guide LG, two Bragg polarization gratings BP1 and BP2 and two polarization switches PS1 and PS2 are provided, which are coupled to one another in order to illuminate the SLM homogeneously. The Bragg polarization grating BP1 is in this case provided for the coupling of light into the light guide LG. For this purpose, the Bragg polarization grating BP1 is optically coupled to the polarization switch PS1 in such a way that the polarization of the light may be modified, when required, so that the light can be coupled by means of the Bragg polarization grating BP1 into the light guide LG according to defined requirements. As may be seen from FIG. 6, right-circularly polarized light is converted by means of the polarization switch PS1 into left-circularly polarized light, and this light is then coupled into the light guide LG by means of the Bragg polarization grating BP1 and then propagates by reflection, preferably by total internal reflection, in the light guide LG. In order to illuminate the SLM homogeneously with light, the light propagating in the light guide LG is coupled out over the entire area of the Bragg polarization grating BP2. This means that the light propagating in the light guide LG is always coupled out only partially at particular positions by means of the Bragg polarization grating BP2 in order to generate homogeneous illumination of the SLM. The diffraction efficiency of the Bragg polarization grating may in this case be deliberately selected to be low, so that only a small part of the light is coupled out of the light guide LG at each position. The still left-circularly polarized light is then incident on the polarization switch PS2 according to the solidly represented arrows, passes through the polarization switch PS2, which is in the switched-on state, and is uniformly incident on the SLM. In the first pass, the polarization switch PS2 changes the light into linearly polarized light. The SLM thereupon modulates the incident linearly polarized light, for example according to an information to be represented. Because of the reflectively configured SLM, this light is reflected, or directed, thereby back in the direction of the light guide LG. This reflected light again passes through the polarization switch PS2, which is now likewise in an ON state, so that the previously linearly polarized light is converted into right-circularly polarized light. This conversion of the light is important so that it can pass unimpeded through the Bragg polarization grating BP2 and through the light guide LG, and is not optically influenced by these two elements. The SLM illumination shown in FIG. 6 relates to only one wavelength being used, or to monochromatic illumination of the SLM. If color (RGB) illumination of the SLM is provided, the use of compensation grating elements may sometimes be necessary in order to correct the dispersion. The Bragg polarization gratings BP1 and BP2 provided for the coupling and the coupling out may preferably have the same optical properties, for example the same grating period and/or the same angle of the grating planes and/or the same thickness of the grating. If these gratings are correspondingly configured, chromatic effects may already be compensated for at least partially by the Bragg polarization gratings BP1 and BP2.

This possibility of using Bragg polarization gratings according to FIG. 6 is particularly suitable for the illumination of micro-SLMs in frontlight devices.

The coupling of light into the light guide need not be configured to be switchable. This means that it is also possible to provide only at least one Bragg polarization grating for the coupling of light into the light guide, without this needing to be coupled to a polarization switch. Furthermore, the active or controllable polarization switch PS2 may also be configured as a passive polarization switch, for example as a retardation plate.

It is of course also possible to use a similar structure in combination with transmissive SLMs. In this case, however, only one polarization switch PS is needed, and this is then used with the Bragg polarization grating BP1 for the coupling of light into the light guide.

Figure 7:
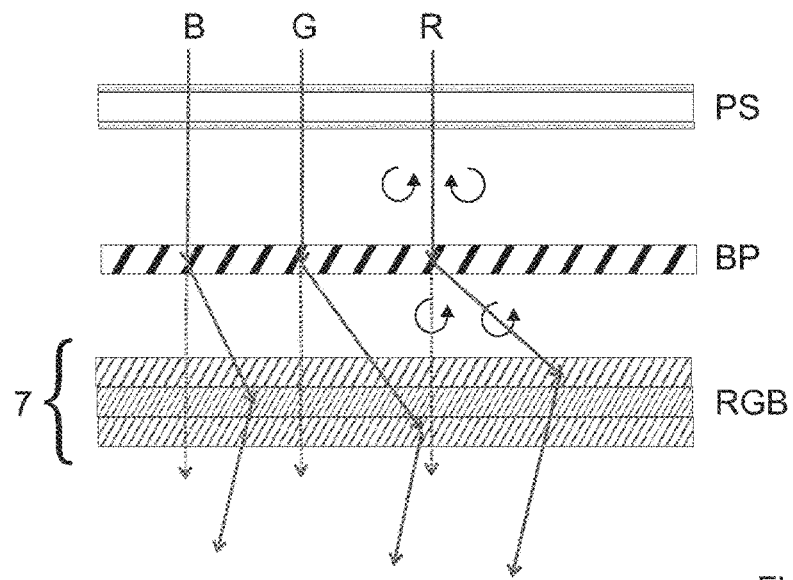
FIG. 7: shows a possibility according to the invention for coarse tracking of a virtual observer region in a schematic representation.

A further exemplary embodiment of the use of a Bragg polarization element in a display device is shown in FIG. 7. This structure shown there is intended to allow coarse tracking of a virtual observer region in an observer plane. The structure shown in FIG. 7 therefore represents a kind of tracking device. Holographic display devices in the name of the Applicant are already known, for example the display device or the light modulation device according to WO 2010/149587 A1, in which solutions for tracking of a virtual observer region are already described in connection with a holographic display device. As is known therefrom, however, a holographically reconstructed scene is only visible for an observer when he positions at least one eye at a virtual observer region, so that he can look through this and observe the scene. For this, however, he must assume a fixed position. If the observer moves, on the other hand, this virtual observer region must be tracked to the new position of the eye of the observer, which is known by the term tracking. To this end, the eye position of the observer is determined by means of a position detection system and the virtual observer region is tracked by means of a tracking device.

Such tracking of the virtual observer region may, for example, be carried out as shown in FIG. 7, only the tracking device per se being shown in FIG. 7 without the represen-tation of an SLM or of a virtual observer region. The tracking device comprises a Bragg polarization grating BP and a polarization switch PS, so that it is possible to select between deflection of the incident light and nondeflection of the light by adjusting the polarization in the polarization switch PS. In this way, the virtual observer region may therefore be moved to a new position. If, as in the case represented, modulated colored (RGB) light coming from the SLM (not represented) is then incident on the combination of the Bragg polarization grating BP and the polarization switch PS, which therefore together form a controllable Bragg polarization grating, this colored light is transmitted undeflected by the Bragg polarization grating BP for a rigidly defined position of the eye of the observer and therefore of the virtual observer region, so long as the polarization switch PS is in an OFF state. This light is therefore used for generating a virtual observer region at a previously rigidly defined position of the observer. If the observer changes his position in relation to the SLM or an image of the SLM, however, the light may be directed in a different direction by switching on the polarization switch PS. This means that if light having a predefined polarization is now incident on the polarization switch PS, the polarization switch PS changes the incident polarization into a polarization for which the Bragg polarization grating BP is sensitive. This polarized light is then incident on the Bragg polarization grating BP and is correspondingly deflected thereby into a first diffraction order with an opposite polarization, as may be seen from the arrows represented. Since, when using colored light, the deflection angles of the light colors of the Bragg polarization grating BP then differ, subsequent optical elements such as compensation grating elements, for example volume gratings, which correct the dispersion of the light, are provided in a stack 7. These compensation grating elements in the stack 7 preferably have an angular and wavelength selectivity which is respectively tailored for one color and for one light incidence angle of the light which is incident on the compensation grating elements from the Bragg polarization grating BP. For example, because of its wavelength selectivity, the first compensation grating element in the stack 7 only deflects red light, the second compensation grating element only deflects blue light and the third compensation grating element only deflects green light. After the compensation grating elements in the stack 7, the light of all three wavelengths propagates further at the same angle.

In order to be able to direct light in a further direction, a further Bragg polarization grating may be provided in combination with a further polarization switch and further compensation grating elements. In this case, however, the grating planes of the grating structure of the further Bragg polarization grating are to be arranged at an angle with respect to the grating planes of the grating structure of the already existing Bragg polarization grating, or the two Bragg polarization gratings are to be arranged with respect to one another in such a way that their grating planes form an angle with one another. Alternatively, the further Bragg polarization grating has a different grating period and the compensation grating elements also have different grating periods.

For example, the entire arrangement shown in FIG. 7, consisting of a polarization switch, a Bragg polarization grating and compensation grating elements, may be mirrored in order to obtain deflection of the light in the opposite direction.

The entire arrangement may, for example, also be rotated through 90 degrees in order to adjust a horizontal deflection with one polarization switch, Bragg polarization grating and compensation grating elements, and to adjust a vertical deflection with the further polarization switch, Bragg polarization grating and compensation grating elements.

This principle is suitable for tracking, in particular for coarse tracking, of a virtual observer window, preferably in a head-up display (HUD). However, this principle is suitable not only for tracking but also for tiling of information to be represented, in this case particularly in a head-mounted display (HMD), but is also suitable for use in an HUD. Such applications will be discussed in more detail below.

In a display device, in particular a holographic display device, which operates with a virtual observer region, besides an optical system for generating a virtual observer region, at least one field lens is also provided, which together with the optical system focuses the light modulated by the SLM and directs it at an eye of an observer in order to generate a virtual observer region there. If the scene to be represented is intended to be displayed in color and if the at least one field lens is diffractively configured, a field lens then needs to be provided for each primary color RGB because of the dispersion of diffractive lenses, i.e. three field lenses are then provided in the display device. For example, the field lenses are configured as volume gratings having a narrow wavelength selectivity, so that respectively only one of these three field lenses acts with a high diffraction efficiency as a lens for each primary color. Since lasers or LEDs are mainly used as light sources in a holographic display device, in order to emit substantially coherent light, the individual color subscenes (subframes), or single-colored subimages, i.e. a green scene, a blue scene and a red scene, are represented time-sequentially. Each subscene contains the entire reconstruction or alternatively only a part of the scene for the color represented. In order to correctly represent the entire scene in color (RGB), the individual subscenes need to be put together and superimposed accurately. This is mainly done by means of the three field lenses, which wavelength-selectively have a high diffraction efficiency respectively only for one color, and which for this purpose are combined with three grating elements for predeflection of the light, each grating element being configured according to the field lens connected with it, and are usually likewise configured as volume gratings having a narrow wavelength selectivity so that they respectively predeflect light with a high diffraction efficiency only for one color.

In the exemplary embodiment now according to the invention, the three grating elements for predeflection of the light respectively for one color are replaced with a Bragg polarization grating which fulfils their function for all three colors. Because of the wide wavelength and angular acceptance, this is most suitable therefor. The individual field lenses for the respective colors must, however, be configured or formed in such a way that their acceptance angle, or their possible light incidence angle, is matched with the natural dispersion of the Bragg polarization grating. Because there are now no longer three grating elements but only one grating element, the crosstalk between the individual grating elements for the predeflection of the light may advantageously be avoided.

Figure 8:
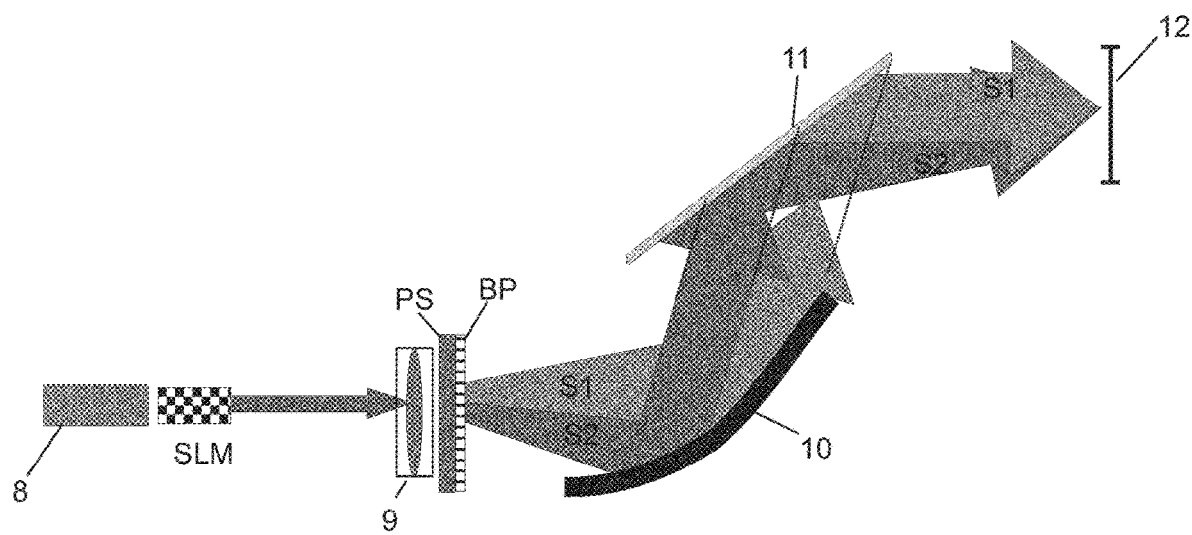
FIG. 8: shows an outline representation of a head-up display according to the invention comprising a controllable Bragg polarization grating, in side view.

The structure according to FIG. 7 may be used not only for tracking of a virtual observer window but also for increasing a field of view in which a reconstructed scene generated by means of a holographic display device is represented. For this purpose, by means of an optical system provided in the display device, a multiple image, consisting of segments, of an SLM is generated, which then determines a field of view within which information, encoded in the SLM, of a scene or of an object is reconstructed for observation through the virtual observer region. The device for increasing a field of view may comprise at least one controllable Bragg polarization grating, which is formed by a Bragg polarization grating and a polarization switch, in a similar way as shown in FIG. 7. Such a device may, for example, be used in an HUD in order to generate therein at least two segments or tiles of a multiple image of an SLM, and therefore increase the field of view for an observer, as is shown in FIG. 8. Head-up displays (HUDs) are used for example in a means of transport, for example an automobile or an aircraft, in order to overlay information such as speed displays, temperature displays, signs, warnings, lane changes, but also assistance functions, navigation system functions or radio functions, into the field of vision of an operator of the means of transport, or of an observer of the information. An HUD usually comprises a projection system, which comprises an illumination device 8, here in this example a laser light source, an SLM and an optical system 9 having imaging elements, for example lenses. The light emerging from the projection system and shown by the thick arrow is reflected by means of an optical unit 10, which may comprise lens elements, mirror elements and/or correction elements, in principle on a windshield 11, in the direction of a virtual observer region 12. The virtual observer region 12 is positioned in the region of at least one eye of the observer. Correct positioning of the virtual observer region 12 with respect to the observer may be carried out by means of a corresponding device in the HUD. The virtual information represented is overlaid in a region of space which is spanned from the virtual observer region 12 to the windshield 11 of the means transport and beyond. The windshield 11 is configured to be transparent, so that the observer can observe the represented information or the represented image overlaid into the environment.

In order now to increase the field of view between the virtual observer region 12 and the windshield 11, or beyond, a controllable Bragg polarization grating, which is formed from a Bragg polarization grating BP and a polarization switch PS, is provided in the HUD. In order to generate at least two segments or tiles of a multiple image of the SLM, the light emitted by the illumination device 8 is directed onto the SLM and is correspondingly modulated there in amplitude and/or phase with information required for a scene to be represented. The SLM may be reflectively or transmissively configured. This modulated light is correspondingly focused by means of the optical system and directed onto the polarization switch PS, which in order to generate a first segment, or tile, is in an OFF state so that the polarization state of the incident light is not modified. The light incident on the Bragg polarization grating BP is thereupon deflected into the zeroth diffraction order and a first segment S1 is generated, which is directed by means of the optical unit 10 and the windshield 11 in the direction of an observer. In order to generate a second segment, the light modulated by the SLM is again directed by means of the optical system 9 onto the polarization switch PS, which is now in the ON state, so that the incident light is modified in its polarization in order to be diffracted by the subsequent Bragg polarization grating BP. The Bragg polarization grating BP thereupon diffracts the incident light into a first diffraction order, so that a second segment S2 is generated. This second segment S2 is also directed by means of the optical unit 10 and the windshield 11 in the direction of the observer. The two segments S1 and S2 of the multiple image of the SLM form a field of view which is substantially increased, or has nearly doubled, in comparison with an HUD without a controllable Bragg polarization grating. By adding a further controllable Bragg polarization grating, which is likewise formed from a Bragg polarization grating and a polarization switch and is arranged directly in the region of the controllable Bragg polarization grating shown in FIG. 8, the field of view may be further increased by generating a further segment. When using an RGB light source for a color representation of the information in the field of view, suitable field lenses should be provided for focusing the individual color segments. These field lenses may again be different volume gratings for red, green or blue light. In an HUD structure, however, it is also possible to use refractive field lenses, for example achromatic lenses, which have a focal length independent of the wavelength, or else mirror elements, which likewise focus independently of the wavelength. In addition to the Bragg polarization grating, it is also possible to use compensation grating elements, for example volume gratings, which have the effect that red, green and blue light is deflected at the same angle, so that the segment S2 is generated for different wavelengths at the same position.

Figure 9:
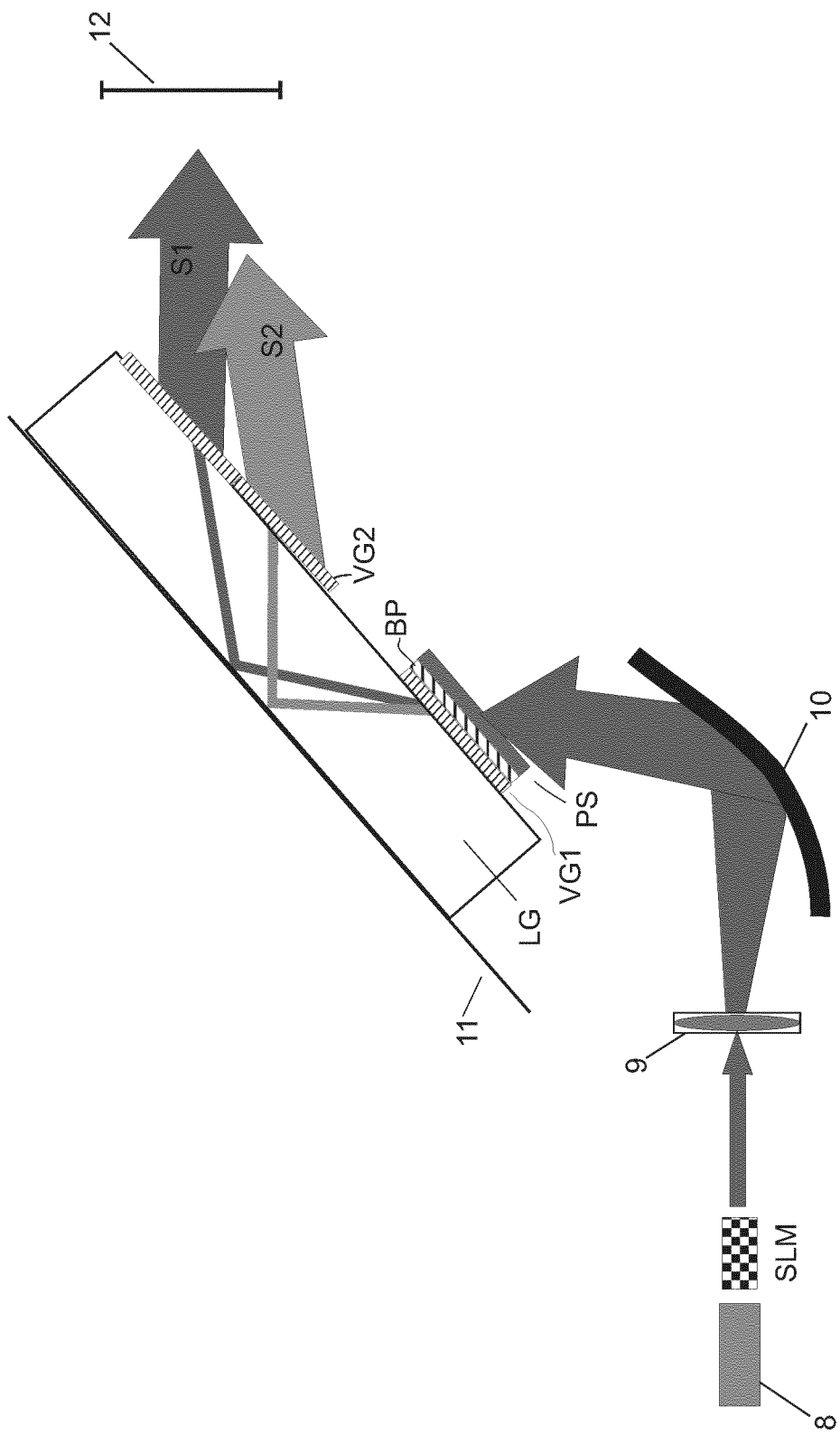
FIG. 9: shows an outline representation of another head-up display according to the invention comprising a controllable Bragg polarization grating, in side view.

In an alternative configuration of a head-up display (HUD) according to FIG. 9, the HUD has a similar structure as in FIG. 8. A projection system is again provided, which comprises an illumination device 8, in this case as well a laser light source, an SLM and an optical system 9 having imaging elements, for example lenses. The light emerging from the projection system and represented by the thick arrow is reflected by means of an optical unit 10, which may comprise lens elements, mirror elements and/or correction elements, in principle on a windshield 11, in the direction of a virtual observer region 12. The virtual observer region 12 is again positioned in the region of at least one eye of the observer. Correct positioning of the virtual observer region 12 with respect to the observer may be carried out by means of a corresponding device in the HUD. The virtual information represented is overlaid in a region of space which is spanned from the virtual observer region 12 to the windshield 11 of the means transport and beyond. The windshield 11 is configured to be transparent, so that the observer can observe the represented information or the represented image overlaid in the environment. In contrast to FIG. 8, a light guide LG is in this case now integrated into the windshield 11 or applied onto the windshield 11 or positioned directly at it, or the windshield 11 itself is used as a light guide. The windshield could also be provided further away from the light guide. The light guide LG is adapted in its shape to the windshield 11, i.e. it may be configured to be planar or at least partially curved. For the coupling of light into the light guide LG, a controllable Bragg polarization grating, which is formed from a Bragg polarization grating BP and a polarization switch PS, is provided. In order to generate at least two segments with this arrangement, for a first segment S1 the polarization switch PS is brought into an OFF state, so that the polarization of the light incident thereon is not modified, and the light is incident on the subsequently provided Bragg polarization grating BP, which is configured not to be sensitive for this polarization of the light. The light therefore passes through the Bragg polarization grating BP without deflection, so that the light is directed into the zeroth diffraction order and is coupled into the light guide LG, optionally through an additional passive grating, for example a volume grating VG1. After one or more reflections at the boundary surfaces of the light guide LG, the light is coupled out of the light guide LG at the position intended therefor. The coupling of light out of the light guide may, for example, likewise be carried out by a passive grating, for example a volume grating VG2. In order to generate a second segment, the polarization switch PS is brought into an ON state, so that the incident light modulated by the SLM is modified in its polarization, to which the subsequently provided Bragg polarization grating BP reacts sensitively. When this light is incident on the Bragg polarization grating BP, it is diffracted by the latter, deflected into a first diffraction order and, optionally in combination with the passive volume grating VG1, coupled at a modified angle into the light guide LG. This light also propagates in the light guide LG, and is coupled out of the light guide LG again at a defined position, optionally with the aid of the further volume grating VG2, for example a volume grating. In this way, a second segment S2 is generated, which is directed in the direction of the observer and, with the first segment S1, forms an increased field of view.

In order to further increase the field of view by generating further segments, at least one further controllable Bragg polarization grating may be provided in the light coupling region of the light guide LG.

Figure 10:
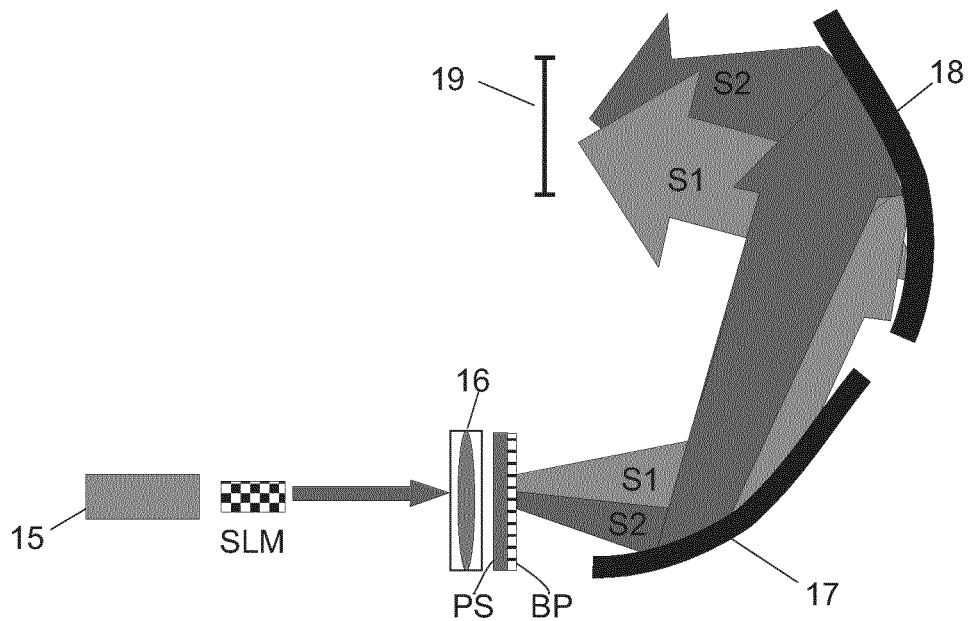
FIG. 10: shows an outline representation of a head-mounted display according to the invention comprising a controllable Bragg polarization grating, in side view.

A device for increasing the field of view by generating a multiple image, composed of segments, of an SLM, which then determines a field of view, in a similar way to a device according to FIGS. 8 and 9, may also be used in a head-mounted display (HMD). One possible embodiment of an HMD having such a device for increasing the field of view is shown in FIG. 10. For this purpose, by means of an optical system provided in the display device, or in the HMD, a multiple image, composed of segments, of an SLM is generated, which then determines a field of view within which information, encoded in the SLM, of a scene or of an object is reconstructed for observation through a virtual observer region. The device for increasing a field of view may comprise at least one controllable Bragg polarization grating, which is formed by a Bragg polarization grating and a polarization switch, in a similar way as shown in FIG. 7. The HMD comprises an illumination device 15, here in this example a laser light source, an SLM and an optical system 16 having imaging elements, for example lenses. The light emerging from the SLM and shown by the thick arrow is directed by means of an optical unit 17, which may comprise lens elements, mirror elements and/or correction elements, in the direction of an optical element 18, which is arranged directly in front of an eye of the user of the HMD. At this optical element 18, which may for example be a spectacle lens, the incident light is deflected in such a way that it is directed in the direction of a virtual observer region 19. The virtual observer region 19 is positioned in the region of at least one eye of the user of the HMD. The eye of the user then perceives the reconstruction of the information or of the hologram encoded in the SLM.

In order to increase the field of view to be generated for the user in an HMD as well, a controllable Bragg polarization grating, which is formed from a Bragg polarization grating BP and a polarization switch PS, is provided in the HMD. The light emitted by the illumination device 15 illuminates the SLM in order to generate at least two segments of a multiple image of the SLM, and is correspondingly modulated by the latter in amplitude and phase with information required for a scene to be represented. The light modulated in this way is then correspondingly focused by means of the optical system 16 and is directed onto the polarization switch PS, which, in order to generate a first segment, is in an OFF state so that the polarization state of the incident light is not modified. The light subsequently incident on the Bragg polarization grating BP is then not deflected and is directed into the zeroth diffraction order, whereupon a first segment S1 is generated, which is directed by means of the optical unit 17 and the optical element 18 in the direction of an observer. At the same time, a virtual observer region 19, through which the eye of the observer can then observe the represented scene, is generated. In order to generate a second segment, the light modulated by the SLM is again directed by means of the optical system 16 onto the polarization switch PS, which is now in an ON state. The light incident is modified in its polarization in such a way that the subsequently arranged Bragg polarization grating BP diffracts the light into a first diffraction order, so that a second segment S2 is generated. This second segment S2 is also directed by means of the optical unit 17 and the optical element 18 in the direction of the eye of the observer, a second virtual observer region, which must be generated at the same position in an observer plane as the first virtual observer region, being generated. In this case as well, in connection with an HMD, the two segments S1 and S2 of the multiple image of the SLM form a field of view which is increased. The information to be represented, or the scene, is generated time-sequentially by the composite virtual image of the SLM.

In this exemplary embodiment as well, the field of view may be increased further by adding at least one further controllable Bragg polarization grating, and therefore by generating at least one further segment. If an RGB light source is used in the illumination device 15 for a color representation of the information in the field of view, then in order to focus the individual color segments, suitable field lenses should also be provided in an HMD, which are correspondingly configured so that the associated field lens may be selected according to a color segment and this segment is focused in the correct direction.

Figure 11:
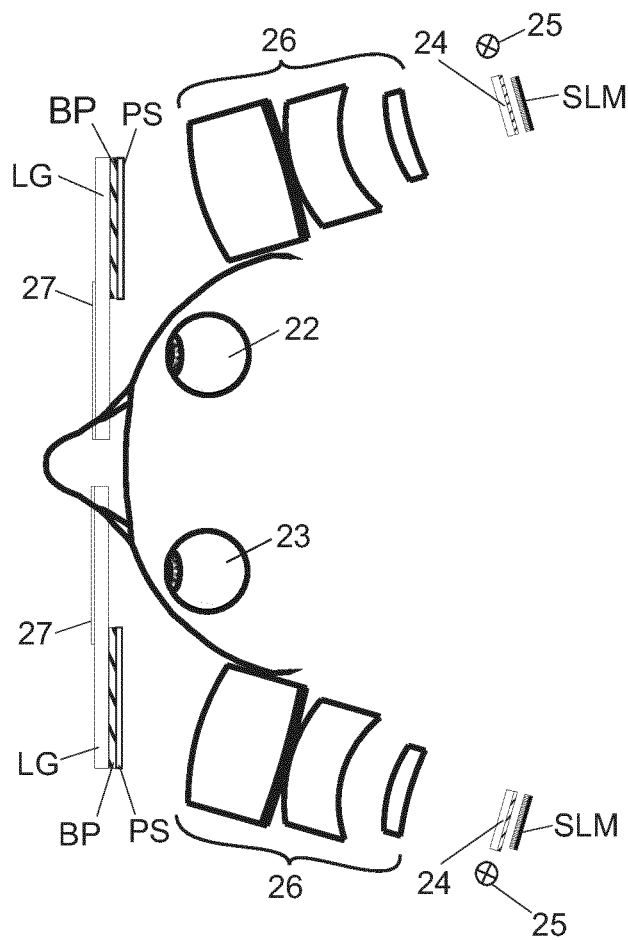
FIG. 11: shows an outline representation of another head-mounted display according to the invention, in top view.

FIG. 11 likewise shows an HMD, although it is configured in an alternative way to the HMD according to FIG. 10. In this case, the generation of a virtual high-resolution composite image of an SLM is schematically represented in top view for a left and a right observer eye 22 and 23 of a user or observer. In this embodiment of an HMD, a light guide LG, which is arranged in the region directly in front of the eye 22, 23, is provided in each beam path for an eye 22, 23. The light guide LG need not be configured in an entirely planar fashion in this case, but may also be configured to be at least partially curved.

As may be seen from FIG. 11, the individual optical components for the left eye and for the right eye 22, 23 are constructed substantially identically, or mirror-symmetrically, so that only the channel for only one eye 22 or 23 will therefore be described below. An SLM, which is reflectively configured, although transmissively configured SLMs may of course also be used, is illuminated by means of frontlight illumination 24. To this end, for a holographic HMD, coherent light of an illumination device 25 is coupled into the frontlight illumination 24. Provided in the beam path after the SLM in the light direction, there is an optical system 26, by means of which the light modulated by the SLM is incident on the light guide LG. In order to couple the light into the light guide LG, at least one controllable Bragg polarization grating is provided in this case. This controllable Bragg polarization grating is again formed by a Bragg polarization grating BP and a polarization switch PS. If the polarization switch PS is in an OFF state, the light from the Bragg polarization grating BP is directed without deflection into the zeroth diffraction order and is coupled into the light guide LG, propagates in the light guide LG, preferably by means of total internal reflection at the two boundary surfaces of the light guide LG, and is coupled out of the light guide LG by means of at least one outcoupling grating 27, for example by means of a volume grating, which is in this case reflectively configured, in the direction of the eye 22, 23. In this way, a first segment for a large field of view is generated. If the polarization switch PS is then brought into an ON state, a second segment may be generated. Because the polarization of the incident light can now be modified by means of the polarization switch PS, the subsequently arranged Bragg polarization grating BP, if it is configured to be sensitive for this modified polarization, diffracts the light into the first diffraction order and is coupled at this incidence angle into the light guide LG. This light also preferably propagates in the light guide LG by means of total internal reflection, and is then coupled out of the light guide LG by means of the at least one outcoupling grating 27 and directed in the direction of the eye 22, 23 of the user. The at least one outcoupling grating 27 is intended respectively to convert a defined light incidence angle into a defined light emergence angle, and therefore into a defined light outcoupling angle, at a defined position of light guide LG. It is of course also possible that the at least one outcoupling grating 27 may be transmissively configured and arranged on the side of the light guide LG facing toward the eye 22, 23. At the position of the eye 22, 23, as described in FIGS. 8 to 10, a virtual observer region, through which the eye can then observe the represented information or scene, is again generated. A plurality of outcoupling gratings may also be provided for the coupling of light out of the light guide LG, each of which is configured for a different angular range. The information to be represented, or the scene, is again generated time-sequentially by the composite virtual image of the SLM.

With respect to a color representation of a scene, as well as the generation of further segments, that which was described above in relation to FIG. 10 is also intended to apply here.

Figure 12:
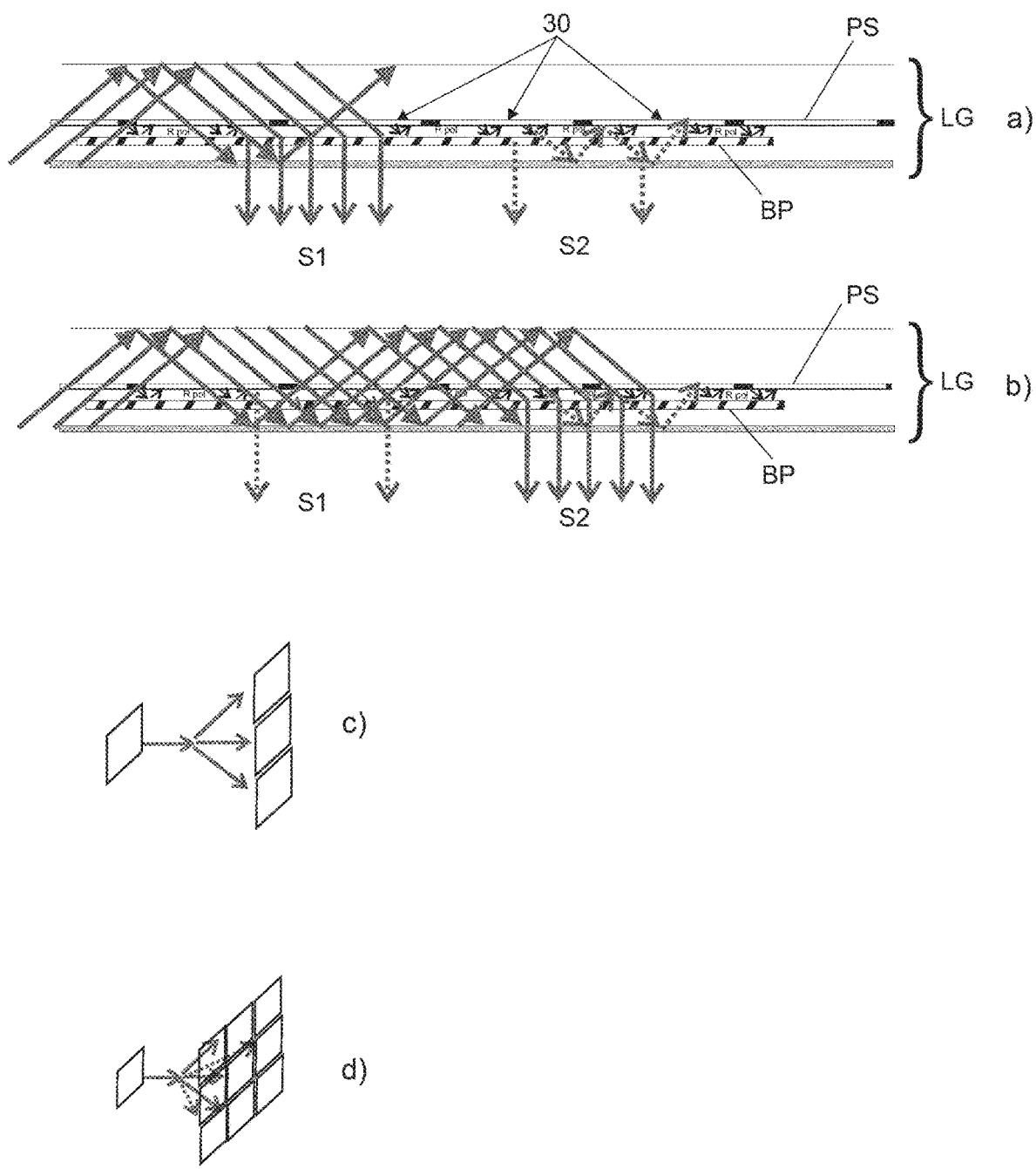
FIG. 12: shows an outline representation of a coupling of light out of a light guide in the generation of a plurality of segments of multiple image of an SLM.

FIG. 12 shows a suitable possibility for the coupling of light out of a light guide with the generation of at least two segments according to FIGS. 9 to 11. This light outcoupling principle may be used in an HUD as well as in an HMD.

For this purpose, the light guide LG is coupled to a controllable Bragg polarization grating, which again comprises a Bragg polarization grating BP and a polarization switch PS. The Bragg polarization grating BP comprises a grating structure having grating planes which are provided inclined with respect to the surface of the grating. The polarization switch PS is configured as a structured polarization switch, preferably a one-dimensionally structured polarization switch, having a fine resolution, in order to achieve the effect that the light for a segment can be coupled out at defined positions of the light guide LG. This means that the structured polarization switch PS is subdivided into individual regions 30 each of which is individually switchable, or controllable. In order to generate and couple light out propagating in the light guide LG, preferably by means of total internal reflection, of a first segment S1 of the light guide LG, for example the polarization switch PS is left in an OFF state so that, for example, there is right-circularly polarized light Rpol (=CR). The light passing through the structured polarization switch PS and through the Bragg polarization grating BP passes through them undeflected and is directed into the zeroth diffraction order. This light is then incident on the boundary surface of the light guide LG, is reflected by the latter and then propagates further at this angle in the light guide LG until this light reaches a position in the light guide LG at which it is intended to be coupled out in a defined way. For this purpose, the individual region 30 of the structured polarization switch PS is controlled at this defined position in the light guide so that only this one region 30 is in an ON state. The light then incident on this region 30 of the structured polarization switch PS is modified in its polarization in such a way that the Bragg polarization grating BP following the structured polarization switch PS is configured to be sensitive therefor. In the present case, this means that the right-circularly polarized light is converted by the region 30 of the structured polarization switch PS into left-circularly polarized light, which is then incident on the Bragg polarization grating BP, is diffracted by the latter into the first diffraction order and is therefore coupled out of the light guide LG. In this way, as may be seen in illustration a) of FIG. 12, a first segment S1 of the multiple image of an SLM is generated.

The way in which a second segment S2 of the multiple image of the SLM is generated may be seen from illustration b) of FIG. 12. This second segment S2 is coupled out of the light guide LG at a different position thereof. For this purpose, a different region 30 of the structured polarization switch PS is brought into an ON state, so that the polarization of the light is modified at this position, so that the light can be coupled out of the light guide LG there. In this way, different regions 30 of the structured polarization switch PS may be controlled, light may be coupled out at different positions of the light guide LG and a plurality of segments Sn, as shown purely schematically and in outline in illustrations c) and d), may be generated, which together form, or generate, a large field of view in which a reconstructed scene may be represented. Illustration c) shows the generation of segments in only one direction, here in the vertical direction. Illustration d), on the other hand, shows the generation two-dimensionally, i.e. segments are generated both vertically and in the horizontal direction in order to generate a two-dimensional field of view.

Preferably, the light is intended to propagate in the light guide LG by means of total internal reflection. It could, however, very well be the case that this cannot be implemented with defined light incidence angles so that the light incidence angle is not greater than the critical angle of total internal reflection. In order nevertheless to make the light propagate in the light guide by reflection, dielectric layer stacks which correspondingly reflect the incident light angle-selectively may be provided on the boundary surfaces of the light guide.

The size of the regions 30 of the structured polarization switch PS depends on the geometry, for instance thickness, refractive index of the material used and possibly curvature, of the light guide used, so that the regions 30 may be adapted correspondingly.

Figure 13:
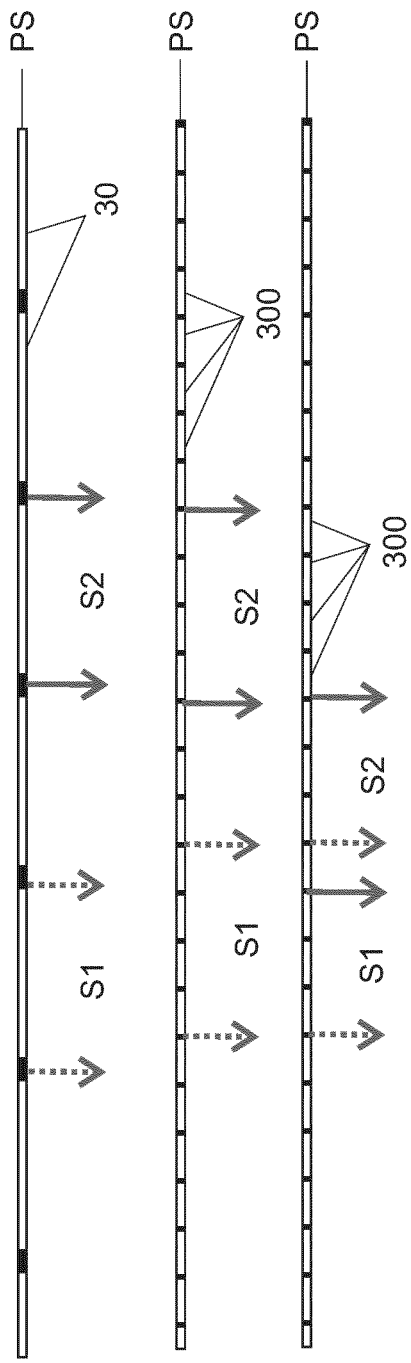

So that there are no gaps in the field of view and therefore in the reconstructed scene, it is necessary for the generated segments of the multiple image of the SLM to be arranged adjacent to one another substantially without gaps, or preferably partially superimposed or overlapping with one another. Advantageously, the regions 30 are configured in such a way that an overlap of the individual neighboring segments in their edge regions is made possible, and the overlap region is not greater than about 5%. As may be seen in FIG. 13, the regions 30 of the structured polarization switch PS may be correspondingly adapted in discrete step widths in order to achieve overlap of neighboring segments in their edge regions. FIG. 13 top and FIG. 12 respectively show a structured polarization switch PS, the separately controllable sections 30 of which are as wide as the segments which are intended to be coupled out. In each case, one section 30 of the polarization switch PS is switched on in order to couple out either segment 1 or segment 2. However, overlap of the segments cannot be achieved in this way. In contrast thereto, FIG. 13 shows in the middle a more finely structured polarization switch PS. In each case, four sections 300 of the structured polarization switch PS are switched on here in order to couple out one segment. As shown in FIG. 13 in the lower representation, the second segment S2 may now be displaced in such a way that in this schematic representation it overlaps by a section 300 of the structured polarization switch PS, in this case around 25%, with the first segment S1. By correspondingly finer structuring, for example 20 sections 300, of the structured polarization switch PS corresponding to one segment, a correspondingly finer overlap, for example by 5%, between the segments S1 and S2 may be adjusted.

Figure 14:
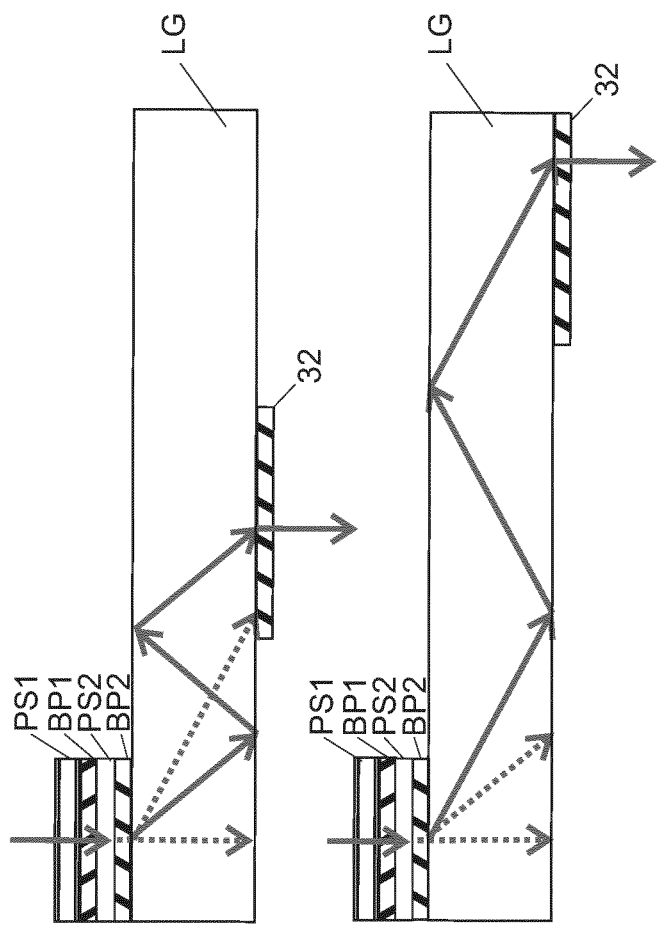
FIG. 14: shows a possibility according to the invention for the coupling of light into a light guide in an outline representation.

FIG. 14 shows a possibility with which light in general, or light which has been modulated by an SLM, may be coupled into a light guide. This principle is generally usable for a coupling of light into a light guide, but may be used particularly in a display device, for example in an HUD or HMD, which respectively comprises at least one light guide. In order to coupling the light into a light guide LG, at least one controllable Bragg polarization grating is provided, which is formed from a Bragg polarization grating BP and a polarization switch PS. In this way, when it has the correct polarization for the Bragg polarization grating BP, the light may be coupled into the light guide by diffraction of the light into a first diffraction order. In order to couple out the light propagating in the light guide LG by reflection, at least one outcoupling grating 32 may be provided, which may for example, as disclosed in connection with FIGS. 12 and 13, be configured as a controllable Bragg polarization grating but also as a volume grating, which on the basis of its angular selectivity for the corresponding light incidence angle must be configured so that the light can be coupled out.

FIG. 14 especially shows a possibility for the coupling of light, which is suitable in particular for the generation of a plurality of segments of a multiple image of an SLM in order to achieve a large field of view. For this purpose, a stack of at least two controllable Bragg polarization gratings is provided, which are used as coupling means and are arranged on the light guide LG. Each controllable Bragg polarization grating comprises a Bragg polarization grating BP1 (BP2) and a polarization switch PS1 (PS2). By means of this stack of two controllable Bragg polarization gratings, the light can be coupled into the light guide LG at two different light incidence angles. For this purpose, the two Bragg polarization gratings BP1 and BP2 have different grating periods, which is intended to be shown by the different inclination of the grating planes in FIG. 14. Two different light incidence angles can thereby be achieved, which can be coupled into the light guide LG in order to generate two segments of a multiple image of an SLM. In the upper illustration of FIG. 14, in order to generate a first light incidence angle, the polarization switch PS1 is brought into an ON state while the polarization switch PS2 is in an OFF state. In this way, the associated Bragg polarization grating BP1 is selected, which then diffracts the incident light having the correct polarization into a first diffraction order and the light is therefore coupled at a first defined light incidence angle into the light guide LG. This is represented by means of the solid arrow.

If, on the other hand, the polarization switch PS2 is in an ON state and the polarization switch PS1 is in an OFF state, according to the lower illustration of FIG. 14, a different light incidence angle to the upper illustration may be achieved. The light incident on the first controllable Bragg polarization grating therefore passes through the Bragg polarization grating BP1 without deflection, or diffraction, so that the light is only diffracted by the Bragg polarization grating BP2 into a first diffraction order and is coupled at a further defined light incidence angle into the light guide LG. This is shown by the solid arrow in the lower illustration. As already mentioned, the two light segments may be coupled out by means of at least one outcoupling grating 32.

In order to generate further segments of a multiple image of an SLM, further controllable Bragg polarization gratings may be provided for the coupling of light into the light guide LG.

The Bragg polarization gratings may also be reflectively configured and couple light out on the opposite side of the light guide.

Figure 15:
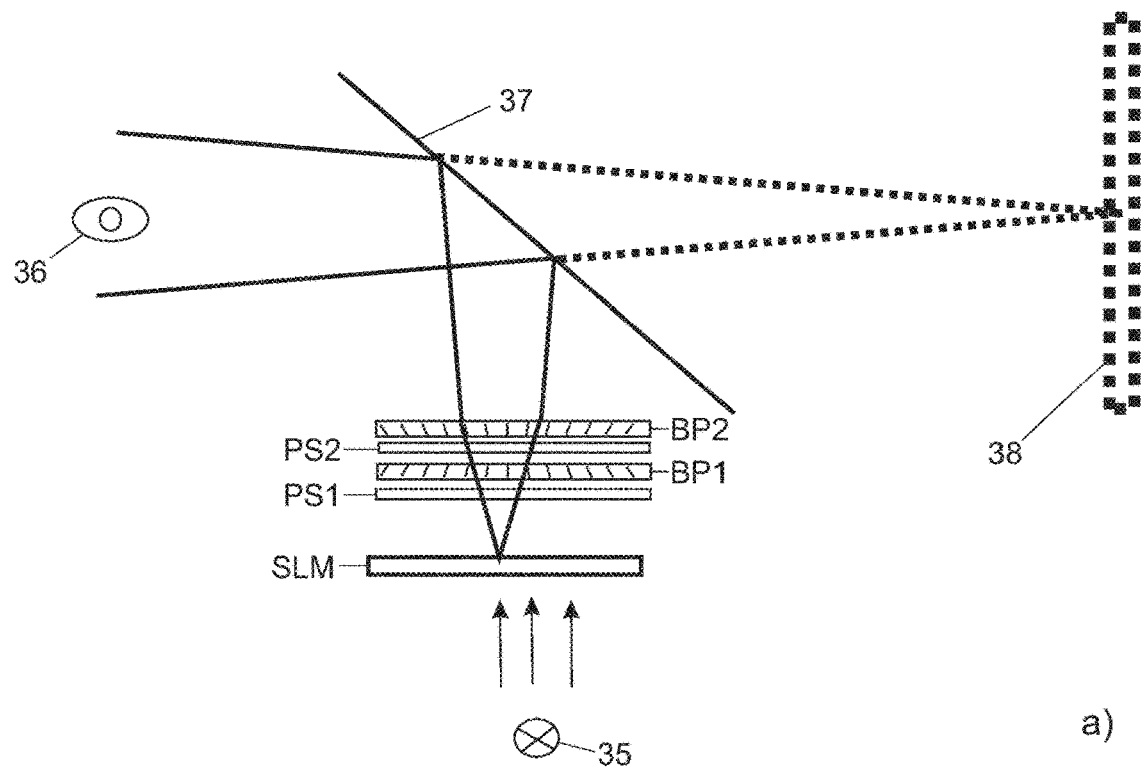
FIG. 15: shows a head-up display, which can be switched between a plurality of depth planes of a represented object, in outline in representations a) and b)
Figure 15:
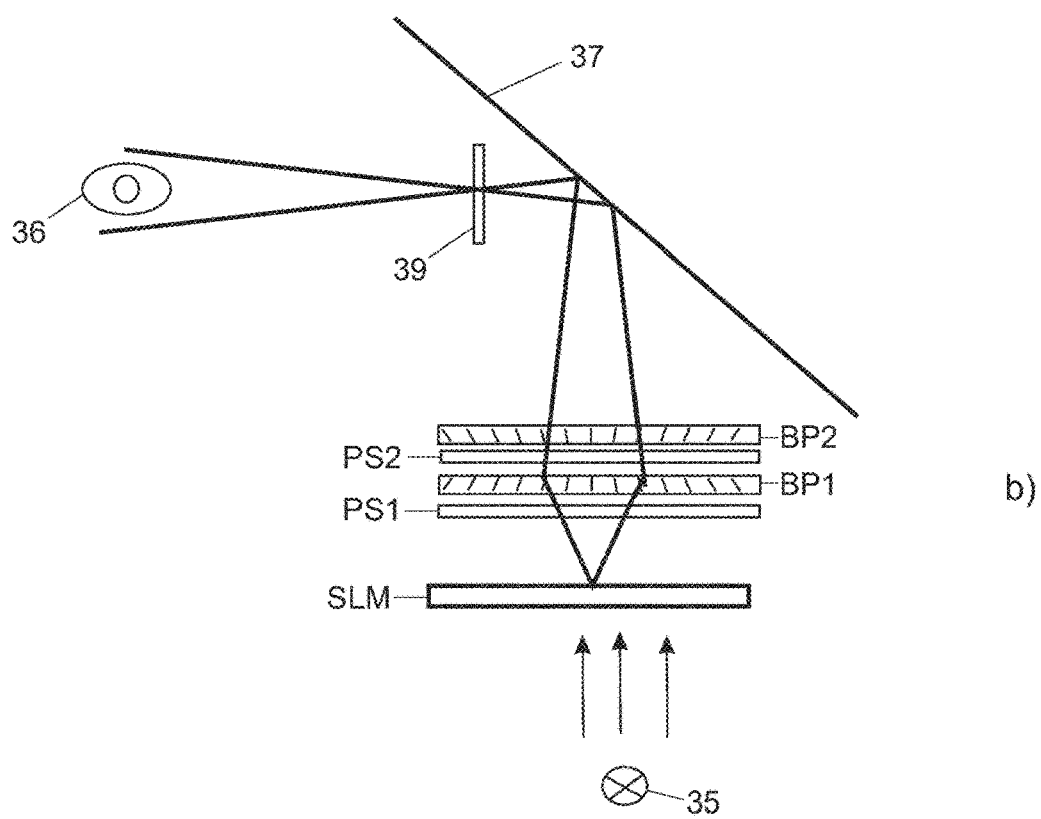

In illustrations a) and b), FIG. 15 schematically shows a head-up display (HUD) which is configured to be switchable between at least two depth planes of a represented object.

The HUD comprises an illumination device 35, an SLM, an optical system (not shown) and at least two controllable Bragg polarization gratings for switching between, in this exemplary embodiment, two different depth planes of an object. The two controllable Bragg polarization gratings comprise respectively a Bragg polarization grating BP and respectively a polarization switch PS, which is optically coupled to the respective Bragg polarization grating. The illumination device 35 illuminates the SLM, which modulates the incident light according to the information to be represented. The two polarization switches PS1 and PS2 and the two Bragg polarization gratings BP1 and BP2, which are configured as lens elements, are now arranged in the beam path after the SLM in the light propagation direction. These lens elements have different focal lengths.

Illustration a) of FIG. 15 shows the HUD in a case in which the polarization switches PS1 and PS2 are controlled in such a way that the first Bragg polarization grating BP1 provided in the light propagation direction deflects the incident light into a first diffraction order, while the second Bragg polarization grating BP2 following the first Bragg polarization grating BP1 in the light propagation direction directs the incident light into a zeroth diffraction order. The lens present in the first Bragg polarization grating BP1 is therefore "switched on", and the lens present in the second Bragg polarization grating BP2 is "switched off". In this case, a virtual image 38 of the SLM is generated at a larger distance from an observer 36, which is intended to be shown by an eye. The observer 36 may then look through a windshield 37 of a means of transport, in which the HUD is integrated, and observe this virtual image 38 of the SLM.

In illustration b) of FIG. 15, the polarization switches PS1 and PS2 are now controlled in such a way that the first Bragg polarization grating BP1 deflects the incident light into the zeroth diffraction order and the second Bragg polarization grating BP2 deflects the incident light into the first diffraction order. In the example shown, the second Bragg polarization grating BP2 then generates a real image 39 of the SLM, which the observer 36 sees inside the means of transport, i.e. in front of the windshield 37, and can observe.

Furthermore, compensation grating elements for correcting the dispersion may also be provided for the two Bragg polarization gratings BP1 and BP2.

The invention is not of course intended to be restricted to the case of one real image and one virtual image of an SLM; rather, a plurality of virtual images and a plurality of real images of the SLM could also be generated at different distances from the observer.

The invention is furthermore not intended to be restricted to the use of two transmissive Bragg polarization gratings. One or both Bragg polarization gratings could also be reflectively configured. Furthermore, the invention is not intended to be restricted to Bragg polarization gratings in the light path between the SLM and the windshield. In particular, one or more reflective Bragg polarization gratings could also be fitted on the windshield.

Figure 16:
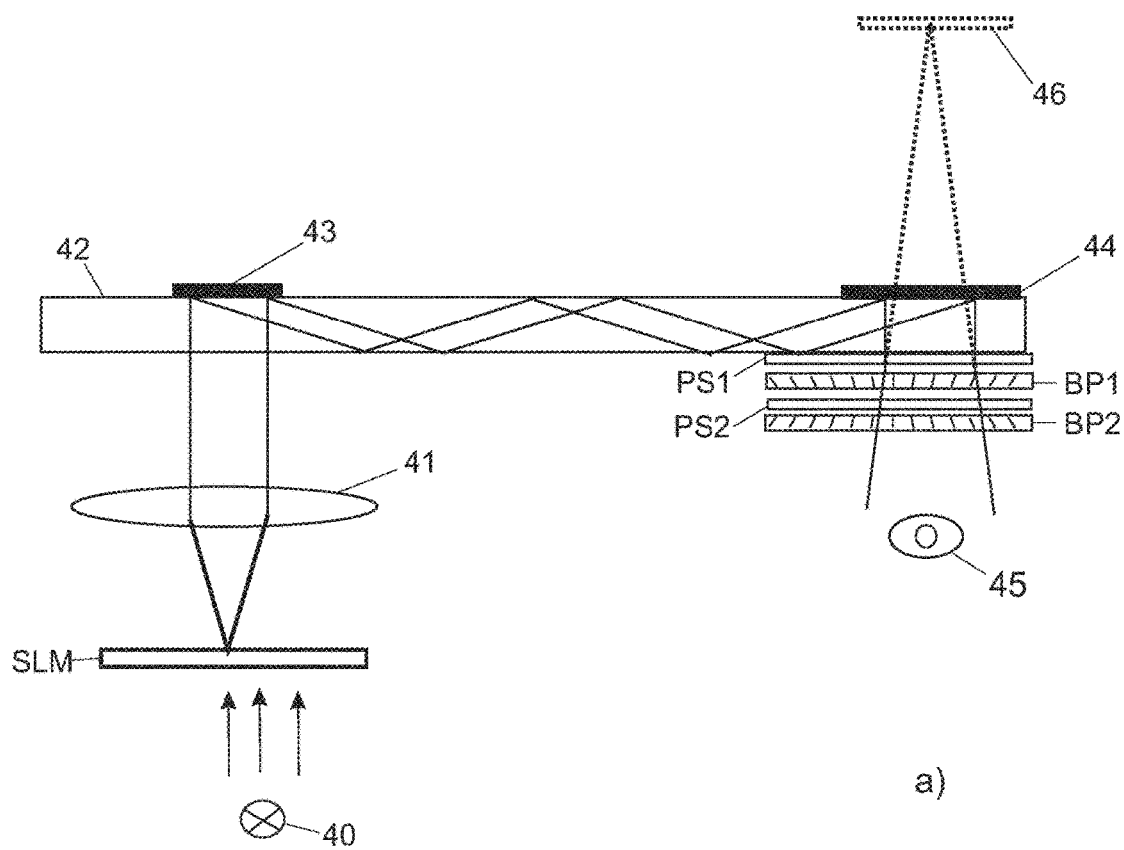
FIG. 16: shows a head-mounted display, which can be switched between a plurality of depth planes of a represented object, in outline in representations a) and b)
Figure 16:
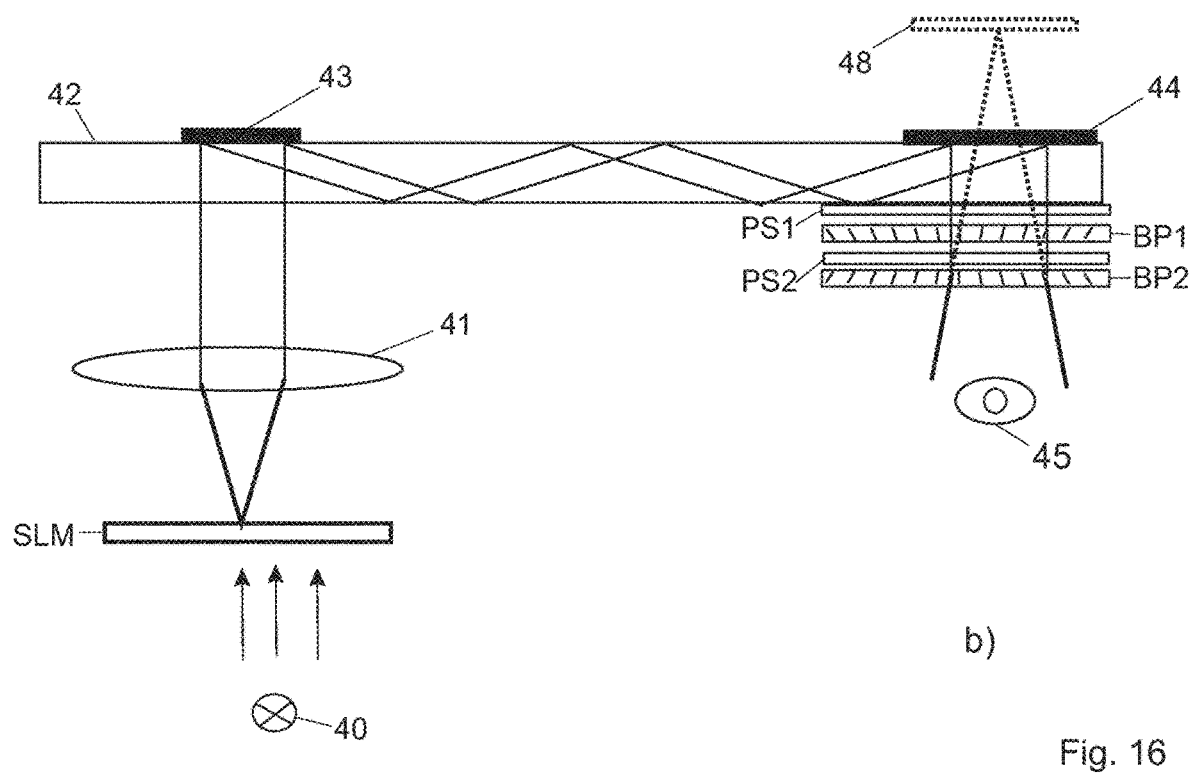

FIG. 16 schematically shows a head-mounted display (HMD) in which the shown object can be represented in two different depth planes.

The HMD comprises an illumination device 40, an SLM, an optical system 41, a light guide 42, a light coupling device 43 and a light outcoupling device 44. The SLM is illuminated by means of the illumination device 40 and modulates the light according to information or a scene to be represented. The SLM is then imaged at infinity by means of the optical system 41, which is shown here as a lens element. This means that light beams that come from an individual pixel of the SLM travel parallel to one another. These light beams are then coupled into the light guide 42 by means of the light coupling device 43 and propagate in the light guide 42 by means of reflection until they are coupled out of the light guide 42 again by means of the light outcoupling device 44. As may be seen in FIG. 16, two controllable Bragg polarization gratings are provided, which are arranged between the light outcoupling device 44 and an observer 45, which is also intended to be shown here only as an eye. In this exemplary embodiment the two controllable Bragg polarization gratings are arranged on an inner-side surface, or boundary surface, of the light guide 42, i.e. as seen from the direction of the observer 45. The two Bragg polarization gratings respectively have a polarization switch PS1, PS2 and respectively a Bragg polarization grating BP1, BP2, the Bragg polarization gratings BP1, BP2 being configured as lens elements, or having lens functions.

In illustration a) of FIG. 16, the two polarization switches PS1 and PS2 are controlled, or switched, in such a way that the first Bragg polarization grating BP1 provided in the light direction after the light outcoupling device 44 diffracts the incident light into a first diffraction order, and the subsequently arranged second Bragg polarization grating BP2 directs the incident light into the zeroth diffraction order. In this way, an image 46 of the SLM is generated at a first distance from the observer 45.

In illustration b) of FIG. 16, the polarization switches PS1 and PS2 are now controlled, or switched, in a different way so that the first Bragg polarization grating BP1 guides, or directs, the incident light into the zeroth diffraction order and the second Bragg polarization grating BP2 diffracts the incident light into the first diffraction order. In this way, an image 48 of the SLM is generated at a second distance from the observer 45.

In this schematically shown FIG. 16, the distance of the image of the SLM to the light guide and the size of the image of the SLM are respectively shown smaller than a view to scale. The light guide itself is usually only a few millimeters thick. The distance of the eye from the light guide may be about 25 mm-30 mm. An image of the SLM is, however, usually generated in a range of between about 20 cm and several meters away from the light guide, and is usually itself magnified in comparison with the SLM.

Furthermore, compensation grating elements for correcting the dispersion may also be provided for the two Bragg polarization gratings BP1 and BP2.

Such an arrangement according to FIG. 16 may preferably also be used in combination with gaze tracking of an observer. If, for example, it is detected that an observer is looking at, or focusing on, a particular object which is closer to the first image of the SLM than to the second image of the SLM, the first image 46 of the SLM is thereupon generated by means of the HMD. If the object focused on is closer to, or in the vicinity of, the second image of the SLM, however, the second image 48 of the SLM is thereupon generated.

The principle described, or the procedure disclosed, may also be extended to more than two controllable Bragg polarization gratings and more than two image planes, or depth planes. This principle may also be combined with additional passive lens elements. Alternatively, the two Bragg polarization gratings of the two controllable Bragg polarization gratings may also guide into the first diffraction order, in order to generate an image of the SLM in a depth plane further away from the observer by combination of the two lens functions of the two Bragg polarization gratings. This kind of tracking in the z direction, or in the axial direction, of the HMD may of course also be combined with fine tracking. Of course, this described principle also applies for an HUD according to FIG. 15.

Figure 17:
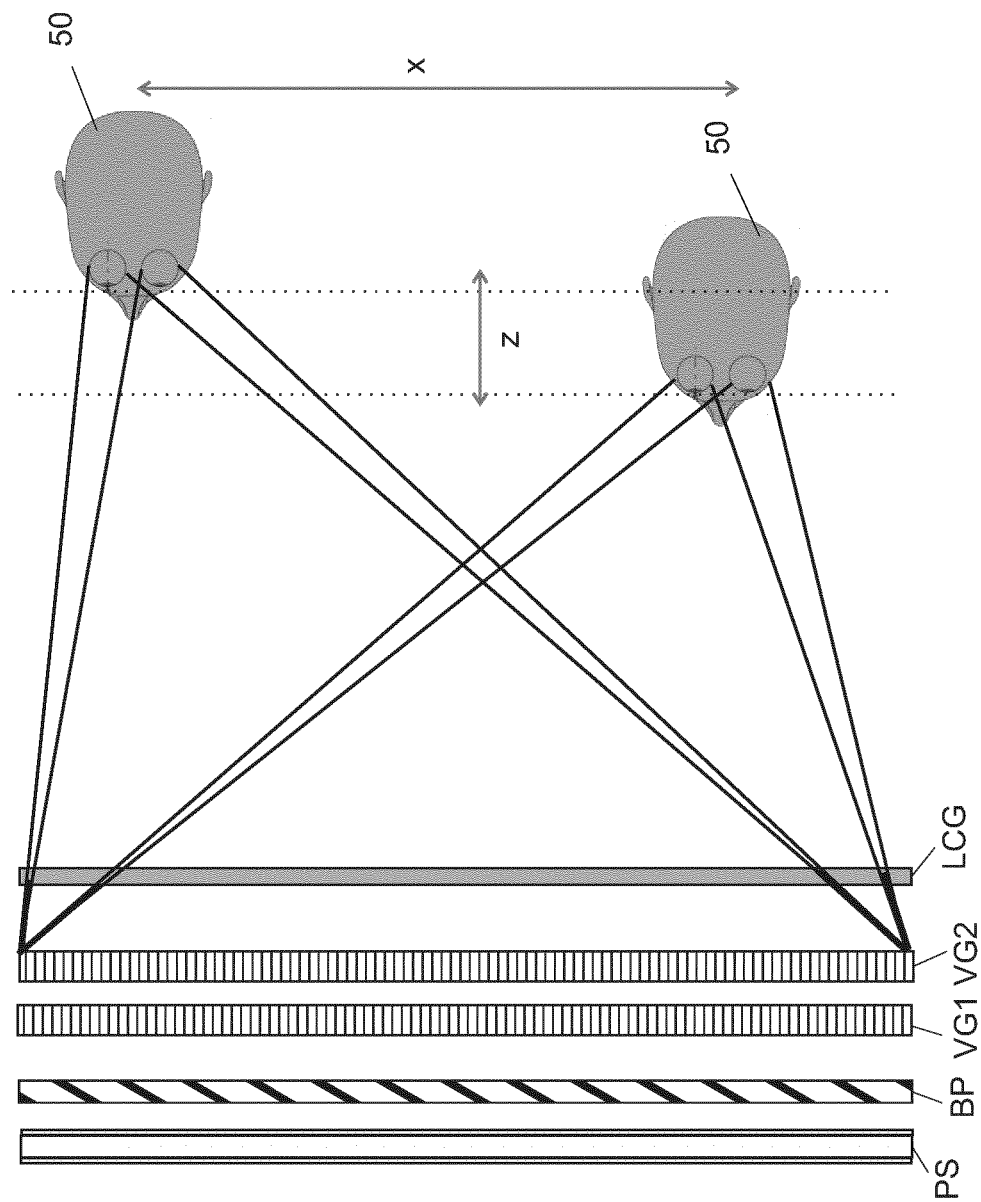
FIG. 17: shows a device for coarse and fine tracking of a virtual observer region in a top view.

FIG. 17 generally shows the way in which a virtual observer region generated by means of a display device may be displaced, i.e. may be moved to a new position, by means of at least one controllable Bragg polarization grating when an observer of a represented scene moves to a new position. In order to generate a preferably holographically represented scene, the display device comprises an illumination device, at least one SLM and an optical system, these elements not being shown for reasons of clarity here and FIG. 17 concentrating only on the tracking of a virtual observer region.

The display device generates a virtual observer region in the region of an eye of an observer 50, so that the observer 50 can observe a represented scene when looking through this virtual observer region. The head of an observer 50, which is located in the upper region in FIG. 17, is intended to be used to explain coarse tracking of the virtual observer window in a lateral direction, here the x direction, the head of the observer 50 in the lower region of FIG. 17 being intended to be used to explain coarse tracking of the virtual observer window in an axial direction, i.e. here the z direction.

For the tracking of the virtual observer region in the event of a position change of the observer 50, the display device comprises at least one controllable Bragg polarization grating which is formed from a Bragg polarization grating BP and a polarization switch PS, at least two grating elements, in this case volume gratings, VG1 and VG2, and liquid crystal gratings LCG. The controllable Bragg polarization grating is used here in combination with the volume gratings VG1 and VG2 for coarse tracking of the virtual observer region in the in xyz direction, while the liquid crystal gratings LCG are provided for fine tracking of the virtual observer region.

If polarized light is now incident on the polarization switch PS in combination with the Bragg polarization grating BP, this light is diffracted, or deflected, by the Bragg polarization grating either into the zeroth diffraction order or into a first diffraction order, according to the given polarization. For the coarse tracking of the virtual observer region, the volume gratings VG1 and VG2, which have a different respectively narrow angular selectivity, are configured as field lenses having a different lateral focal point or different focal length, so that the light can correspondingly be focused differently in the z direction. By means of the polarization switch PS, the polarization of the incident light emitted by the illumination device and modulated by the SLM is adjusted in such a way that the Bragg polarization grating BP directs the light either into the zeroth diffraction order or into a first diffraction order. The incidence angles of the volume gratings VG1 and VG2 are adjusted, or configured, in such a way that one volume grating, for example the volume grating VG1, focuses the light from the zeroth diffraction order of the Bragg polarization grating BP with a high diffraction efficiency into a first z plane, for example into the z plane in which the observer 50 is located in the upper region of FIG. 17. The further volume grating, for example the volume grating VG2, then focuses the light from the first diffraction order of the Bragg polarization grating BP with a high diffraction efficiency into a different z plane, for example into the z plane in which the observer 50 is located in the lower region of FIG. 17. By means of at least one controllable Bragg polarization grating, it is therefore possible to control grating elements having lens functions, which then focus the light into a required z plane.

For coarse tracking of the virtual observer region, for example as shown here in the x direction, the polarization of the light is adjusted by means of the polarization switch PS in such a way that the Bragg polarization grating BP directs the incident light either into the zeroth diffraction order or into a first diffraction order. The incident light is then deflected at two different angles, depending on the switching state of the polarization switch PS coupled to the Bragg polarization grating BP. These two deflection angles are adapted to the angular acceptance of the different volume gratings VG1 and VG2 arranged subsequently in the beam path, so that either the volume grating VG1 or the volume grating VG2 is addressed and the light is deflected correspondingly. In this way, the light may be directed in a controlled way in a lateral (x-y direction) direction and the virtual observer region may be displaced according to a new position of the observer 50, as may be seen by the illustration of the two heads of the observer 50.

The two possibilities of coarse tracking, tracking in the lateral direction and tracking in the axial direction, may be combined with one another. Furthermore, the coarse tracking may be combined with fine tracking of the virtual observer region, it being possible to carry that out by means of the liquid crystal gratings LCG.

The invention is not restricted to the exemplary embodiments shown here. Further combinations of the embodiments, or exemplary embodiments, are also possible. In conclusion, it should more particularly be pointed out that the exemplary embodiments described above merely serve to describe the claimed teaching, but this teaching is not intended to be restricted to the exemplary embodiments.

The invention claimed is:

1. A display device for representing three-dimensional scenes, comprising:
   at least one illumination device,
   at least one spatial light modulation device,
   at least one Bragg polarization grating, the Bragg polarization grating comprises at least one birefringent layer and incident light is deflectable at a deflection angle of at least 20°, and
   at least one lens element, which is configured as a Bragg polarization grating and is coupled with a polarization switch, the at least one lens element configured as a Bragg polarization grating comprises a grating structure having different local grating periods.

2. The display device as claimed in claim 1, wherein the at least one Bragg polarization grating has a high diffraction efficiency of η>80% in combination with a wide angular selectivity of ≥+10 degrees and a wide wavelength selectivity of ±150 nm.

3. The display device as claimed in claim 1, wherein the at least one Bragg polarization grating is produced by means of bulk photoalignment method.

4. The display device as claimed in claim 1, wherein the at least one Bragg polarization grating has a thickness in a range of from 0.7 μm to 2 μm.

5. The display device as claimed in claim 1, wherein the at least one Bragg polarization grating has a grating period of Λ<1 μm.

6. The display device as claimed in claim 1, wherein the wavelength of the light emitted by the illumination device lies in the visible range.

7. The display device as claimed in claim 1, further comprising at least one polarization switch, with which the polarization state of the incident light is modifiable.

8. The display device as claimed in claim 7, wherein the at least one Bragg polarization grating is combined with the at least one polarization switch and is configured as a controllable Bragg polarization grating, incident light emerging deflected or undeflected from the Bragg polarization grating depending on the switching state of the latter.

9. The display device as claimed in claim 1, wherein the light is deflectable into a zeroth diffraction order or into a first diffraction order by means of the Bragg polarization grating, the polarization state of the light deflected into a first diffraction order being different to the polarization state of the light incident on the Bragg polarization grating.

10. The display device as claimed in claim 1, wherein in order to generate frontlight illumination of a reflectively configured spatial light modulation device, a light guide and at least two Bragg polarization gratings are provided, which are coupled to one another in such a way that the spatial light modulation device is illuminated uniformly.

11. The display device as claimed in claim 10, wherein a first Bragg polarization grating is provided for the coupling of light into the light guide, the light propagating by reflection.

12. The display device as claimed in claim 11, wherein the light propagates in the light guide by total internal reflection.

13. The display device as claimed in claim 10, wherein a second Bragg polarization grating is provided for the outcoupling of light propagating in the light guide by reflection.

14. The display device as claimed in claim 10, wherein a polarization switch or a wave plate, which modifies the light coupled out of the light guide in its polarization state, is provided between the light guide and the spatial light modulation device in the light direction.

15. The display device as claimed in claim 1, wherein in order to generate illumination of a transmissively configured spatial light modulation device, a light guide and at least two Bragg polarization gratings are provided, which are coupled to one another in such a way that the spatial light modulation device is illuminated uniformly.

16. The display device as claimed in claim 10, wherein a Bragg polarization grating for the coupling of light into and a Bragg polarization grating for the coupling of light out of the light guide have the same optical properties.

17. The display device as claimed in claim 16, wherein the Bragg polarization grating for the coupling of light into and the Bragg polarization grating for the coupling of light out of the light guide have the same grating period and/or the same grating thickness and/or an equal inclination of the grating planes.

18. The display device as claimed in claim 1, further comprising at least one optical system, the at least one optical system being provided for generating a virtual observer region, through which an observer can observe a represented scene.

19. The display device as claimed in claim 18, wherein at least two Bragg polarization gratings are provided, which respectively comprise a grating structure having grating planes, the two Bragg polarization gratings being arranged with respect to one another in such a way that their grating planes form a defined angle with one another.

20. The display device as claimed in claim 19, wherein the at least two Bragg polarization gratings have different grating periods.

21. The display device as claimed in claim 19, wherein the at least two Bragg polarization gratings are coupled with at least two polarization switches.

22. The display device as claimed in claim 18, wherein the at least one Bragg polarization grating in combination with at least one optical system is provided for coarse tracking of the virtual observer region in the x direction, y direction and/or z direction.

23. The display device as claimed in claim 1, further comprising at least one optical system that is configured in such a way that a multiple image, constructed from segments, of the spatial light modulation device is generatable, the multiple image determining a field of view within which information, encoded in the spatial light modulation device, of a scene is reconstructable for observation through a virtual observer region.

24. The display device as claimed in claim 23, wherein the at least one Bragg polarization grating is combined with the at least one polarization switch and is configured as at least one controllable Bragg polarization grating, such that in one switching state of the at least one controllable Bragg polarization grating, one segment is generatable, and in another switching state of the at least one controllable Bragg polarization grating, a further segment of the multiple image of the spatial light modulation device, constructed from segments, is generatable.

25. The display device as claimed in claim 24, further comprising a light guide, by means of which and in combination with the at least one optical system, the multiple image, constructed from segments, of the spatial light modulation device is generatable.

26. The display device as claimed in claim 25, wherein the light coupled into the light guide propagates in the light guide by reflection and can be coupled out of the light guide by means of at least one controllable Bragg polarization grating.

27. The display device as claimed in claim 26, wherein the at least one polarization switch is configured as a structured polarization switch.

28. The display device as claimed in claim 25, wherein at least one controllable Bragg polarization grating is provided for the coupling of light into the light guide, the at least one controllable Bragg polarization grating being formed from a Bragg polarization grating and a polarization switch, the incident light being diffractable at a light incidence angle into a first diffraction order by means of the controllable Bragg polarization grating.

29. The display device as claimed in claim 28, wherein the light incidence angle has a value which is greater than the critical angle of total internal reflection.

30. The display device as claimed in claim 28, wherein a stack of at least two Bragg polarization gratings is provided, the at least two Bragg polarization gratings respectively being coupled with a polarization switch, different light incidence angles in the light guide being generatable and the light propagating in the light guide by reflection.

31. The display device as claimed in claim 23, wherein the generated segments of the multiple image of the spatial light modulation device are arranged adjacent to one another substantially without gaps or partially overlapping with one another, regions of the overlaps can be taken into account during the encoding of information of the scene to be generated into the spatial light modulation device.

32. The display device as claimed in claim 1, wherein the at least one lens element is provided as a field lens for tracking of the virtual observer region in the z direction.

33. The display device as claimed in claim 1, wherein the display device is configured as a holographic display device or as a stereoscopic display device.

34. The display device as claimed in claim 1, wherein the display device is configured as a direct-view display, as a head-up display or as a head-mounted display, two such display devices forming a head-mounted display and respectively being assigned to a left eye of an observer and to a right eye of the observer.

35. The display device as claimed in claim 1, wherein, at least one compensation grating element is provided in order to compensate for the dispersion of the light in a color representation of scenes.

36. A display device for representing three-dimensional scenes, comprising:
- at least one illumination device,
- at least one spatial light modulation device,
- at least one Bragg polarization grating, the Bragg polarization grating comprises at least one birefringent layer and incident light is deflectable at a deflection angle of at least 20°, and
- at least one optical system configured to generate a multiple image, constructed from segments, of the at least one spatial light modulation device, where the generated segments of the multiple image of the at least one spatial light modulation device are arranged adjacent to one another substantially without gaps or partially overlapping with one another.

* * * * *